United States Patent
Iwase et al.

(10) Patent No.: US 11,217,230 B2
(45) Date of Patent: Jan. 4, 2022

(54) INFORMATION PROCESSING DEVICE AND INFORMATION PROCESSING METHOD FOR DETERMINING PRESENCE OR ABSENCE OF A RESPONSE TO SPEECH OF A USER ON A BASIS OF A LEARNING RESULT CORRESPONDING TO A USE SITUATION OF THE USER

(71) Applicant: SONY CORPORATION, Tokyo (JP)

(72) Inventors: Hiro Iwase, Kanagawa (JP); Shinichi Kawano, Tokyo (JP); Yuhei Taki, Kanagawa (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 276 days.

(21) Appl. No.: 16/472,544

(22) PCT Filed: Nov. 1, 2018

(86) PCT No.: PCT/JP2018/040663
§ 371 (c)(1),
(2) Date: Jun. 21, 2019

(87) PCT Pub. No.: WO2019/098038
PCT Pub. Date: May 23, 2019

(65) Prior Publication Data
US 2021/0134278 A1   May 6, 2021

(30) Foreign Application Priority Data

Nov. 15, 2017   (JP) .............................. JP2017-219683

(51) Int. Cl.
*G10L 15/18*   (2013.01)
*G06F 40/30*   (2020.01)
(Continued)

(52) U.S. Cl.
CPC .......... *G10L 15/1815* (2013.01); *G06F 40/30* (2020.01); *G06N 7/005* (2013.01);
(Continued)

(58) Field of Classification Search
CPC ............... G10L 15/04; G10L 2015/088; G10L 15/1815; G10L 15/1822; G10L 15/183;
(Continued)

(56) References Cited

U.S. PATENT DOCUMENTS

| | | | | |
|---|---|---|---|---|
| 6,219,645 | B1 * | 4/2001 | Byers ...................... | G10L 15/02 381/91 |
| 9,275,641 | B1 * | 3/2016 | Gelfenbeyn ............ | G10L 15/22 |

(Continued)

FOREIGN PATENT DOCUMENTS

| | | | | |
|---|---|---|---|---|
| JP | 2012226068 | A * | 11/2012 | ............. G06F 40/30 |
| JP | 2017156854 | A * | 9/2017 | |

(Continued)

OTHER PUBLICATIONS

N. Gupta, G. Tur, D. Hakkani-Tur, S. Bangalore, G. Riccardi and M. Gilbert, "The AT&T spoken language understanding system," Jan. 2006, in IEEE Transactions on Audio, Speech, and Language Processing, vol. 14, No. 1, pp. 213-222, (Year: 2006).*

(Continued)

*Primary Examiner* — Eric Yen
(74) *Attorney, Agent, or Firm* — Paratus Law Group, PLLC

(57) ABSTRACT

There is provided an information processing device and an information processing method that enable speeding up of a responsivity of a system response to a speech of a user. The information processing device includes a processing unit configured to determine, on the basis of a result of semantic analysis that is to be obtained from an interim result of speech recognition of a speech of a user, presence or absence (Continued)

of a response to the speech of the user. It thereby becomes possible to speed up a responsivity of a system response to the speech of the user. The present technology can be applied to a speech dialogue system, for example.

17 Claims, 13 Drawing Sheets

(51) Int. Cl.
    *G06N 7/00*     (2006.01)
    *G10L 25/78*     (2013.01)
    *G10L 15/22*     (2006.01)

(52) U.S. Cl.
    CPC .............. *G10L 15/22* (2013.01); *G10L 25/78* (2013.01); *G10L 2025/783* (2013.01)

(58) Field of Classification Search
    CPC ... G10L 15/22; G10L 2015/223; G10L 25/78; G10L 2025/783; G06F 16/3329; G06F 16/3344; G06F 16/90332; G06F 40/279; G06F 40/289; G06F 40/30; G06N 7/005
    See application file for complete search history.

(56) References Cited

U.S. PATENT DOCUMENTS

| | | | | |
|---|---|---|---|---|
| 10,089,981 B1* | 10/2018 | Elangovan | ............ | H04M 1/271 |
| 10,102,851 B1* | 10/2018 | Kiss | .................... | G10L 15/1822 |
| 10,171,662 B1* | 1/2019 | Zhou | ...................... | H04L 51/02 |
| 10,366,690 B1* | 7/2019 | Sarikaya | ................ | G10L 25/54 |
| 10,430,859 B2* | 10/2019 | Ignatyev | ............ | G06Q 30/0631 |
| 2003/0216918 A1* | 11/2003 | Toyama | .................. | G10L 15/08 704/254 |
| 2004/0006483 A1* | 1/2004 | Sasaki | .................... | G10L 15/22 704/277 |
| 2005/0033582 A1* | 2/2005 | Gadd | ...................... | G06Q 30/02 704/277 |
| 2007/0016426 A1* | 1/2007 | Hershey | .................. | G10L 15/26 704/277 |
| 2007/0061152 A1* | 3/2007 | Doi | ......................... | G06F 40/58 704/277 |
| 2008/0097762 A1* | 4/2008 | Kunz | .................... | G06F 40/174 704/276 |
| 2008/0183462 A1* | 7/2008 | Ma | .......................... | G06F 40/30 704/9 |
| 2009/0162824 A1* | 6/2009 | Heck | ...................... | G06N 3/004 434/322 |
| 2012/0131041 A1* | 5/2012 | Ashland | ............... | G06Q 10/101 707/769 |
| 2012/0271633 A1* | 10/2012 | Yoshida | .................. | G10L 15/26 704/248 |
| 2013/0322665 A1* | 12/2013 | Bennett | ............. | G01C 21/3617 381/300 |
| 2013/0332172 A1* | 12/2013 | Prakash | ............ | H04M 1/72412 704/270.1 |
| 2014/0222436 A1* | 8/2014 | Binder | .................... | G10L 17/24 704/275 |
| 2015/0052090 A1* | 2/2015 | Lin | ........................ | G06N 7/005 706/12 |
| 2016/0239537 A1* | 8/2016 | Cunico | ............... | G06F 16/3346 |
| 2016/0379106 A1* | 12/2016 | Qi | .......................... | G06F 40/295 706/11 |
| 2016/0379632 A1* | 12/2016 | Hoffmeister | ........... | G10L 25/87 704/253 |
| 2017/0031896 A1* | 2/2017 | Dymetman | .......... | G06F 40/216 |
| 2017/0032186 A1* | 2/2017 | Murata | ................. | G06F 3/0304 |
| 2017/0169829 A1* | 6/2017 | Celikyilmaz | .......... | G10L 17/26 |
| 2017/0243136 A1* | 8/2017 | Ho Kang | ............... | G06N 20/00 |
| 2017/0256261 A1* | 9/2017 | Froelich | .................. | G10L 15/02 |
| 2017/0337913 A1* | 11/2017 | Guegan | ................... | G10L 21/10 |
| 2018/0052664 A1* | 2/2018 | Zhang | ............... | G06F 16/90332 |
| 2018/0067928 A1* | 3/2018 | Miura | ..................... | G10L 15/26 |
| 2018/0165379 A1* | 6/2018 | Ramnani | ................. | G06F 9/543 |
| 2018/0189273 A1* | 7/2018 | Campos | ............... | G06Q 30/016 |
| 2018/0211179 A1* | 7/2018 | Dzierwa | ................ | G06N 20/00 |
| 2018/0314573 A1* | 11/2018 | Chang | .................. | G06F 11/3452 |
| 2018/0336890 A1* | 11/2018 | Xiong | ..................... | G06F 40/30 |
| 2019/0139547 A1* | 5/2019 | Wu | ......................... | G10L 15/25 |
| 2020/0026488 A1* | 1/2020 | Yoon | ......................... | G06F 8/30 |
| 2020/0151258 A1* | 5/2020 | Yuan | ........................ | G10L 15/22 |

FOREIGN PATENT DOCUMENTS

| | | | | |
|---|---|---|---|---|
| WO | WO-2015150634 A1 * | 10/2015 | ............. | G06T 7/174 |
| WO | WO-2016157658 A1 * | 10/2016 | ............. | G10L 25/48 |

OTHER PUBLICATIONS de Leeuw, J. R. "Dynamic constraints in statistical learning", 2016 Available from ProQuest Dissertations and Theses Professional. Retrieved from https://dialog.proquest.com/professional/docview/1825682461?accountid=131444 (Year: 2016).*

European Search Opinion for EP 18879800 dated Mar. 17, 2020 (Year: 2020).*

Supplementary European search report for EP 18879800 dated Mar. 17, 2020 (Year: 2020).*

English Translation of the Written Opinion of the International Search Authority for PCT/JP2018/040663 dated May 15, 2020 (Year: 2020).*

English Translation of International Preliminary Report on Patentability Chapter I for PCT/JP2018/040663 dated May 19, 2020 (Year: 2020).*

Klare, B. F., "Heterogeneous face recognition", 2012, Available from ProQuest Dissertations and Theses Professional. Retrieved from https://dialog.proquest.com/professional/docview/1014174211?accountid=131444 (Year: 2012).*

* cited by examiner

INFORMATION PROCESSING DEVICE AND INFORMATION PROCESSING METHOD FOR DETERMINING PRESENCE OR ABSENCE OF A RESPONSE TO SPEECH OF A USER ON A BASIS OF A LEARNING RESULT CORRESPONDING TO A USE SITUATION OF THE USER

CROSS REFERENCE TO PRIOR APPLICATION

This application is a National Stage Patent Application of PCT International Patent Application No. PCT/JP2018/040663 (filed on Nov. 1, 2018) under 35 U.S.C. § 371, which claims priority to Japanese Patent Application No. 2017-219683 (filed on Nov. 15, 2017), which are all hereby incorporated by reference in their entirety.

TECHNICAL FIELD

The present technology relates to an information processing device and an information processing method, and particularly to an information processing device and an information processing method that enable speeding up of a responsivity of a system response to a speech of a user.

BACKGROUND ART

In recent years, a speech dialogue system that makes a response corresponding to a speech of a user has started to be used in various fields. The speech dialogue system is required not only to recognize a voice of the speech of the user, but also to make an appropriate response by estimating the intention of the speech of the user.

For example, Patent Literature 1 discloses a technology of independently setting a duration time to a portion at which a speech can possibly pause halfway, in information defining a word order of the speech, and when the pause of the speech continues for the set duration time or more during speech recognition, detecting the completion of the speech, and making a response.

CITATION LIST

Patent Literature

Patent Literature 1: JP H6-202689A (JP 3277579B)

DISCLOSURE OF INVENTION

Technical Problem

Nevertheless, in the case of deciding a pause time using only a word order of a speech, as disclosed in Patent Literature 1 described above, because a situation of a dialogue with a user is not considered, there is a possibility that the completion of the speech of the user fails to be correctly detected, depending on the situation. Then, when the completion of the speech of the user fails to be correctly detected, in the speech recognition, a user speech standby state is caused, and a responsivity of a system response becomes slow.

The present technology has been devised in view of such a situation, and enables speeding up of a responsivity of a system response to a speech of a user.

Solution to Problem

An information processing device according to an aspect of the present technology is an information processing device including: a processing unit configured to determine, on the basis of a result of semantic analysis that is to be obtained from an interim result of speech recognition of a speech of a user, presence or absence of a response to the speech of the user.

An information processing method according to an aspect of the present technology is an information processing method of an information processing device, the information processing method including: the information processing device determining, on the basis of a result of semantic analysis that is to be obtained from an interim result of speech recognition of a speech of a user, presence or absence of a response to the speech of the user.

In the information processing device and the information processing method according to the aspect of the present technology, the presence or absence of a response to the speech of the user is determined on the basis of a result of semantic analysis that is to be obtained from the interim result of the speech recognition of the speech of the user.

The information processing device according to the aspect of the present technology may be an independent device or may be an internal block constituting one device.

Advantageous Effects of Invention

According to the aspect of the present technology, it is possible to speed up a responsivity of a system response to a speech of a user.

Moreover, the advantageous effects mentioned here are not necessarily limited and any advantageous effect described in the present disclosure may be obtained.

MODE(S) FOR CARRYING OUT THE INVENTION

Hereinafter, an embodiment of the present technology will be described with reference to the drawings. Moreover, the description will be given in the following order.

1. Presupposition technology
2. Embodiment of present technology
3. Modified example
4. Configuration of computer

1. Presupposition Technology

First of all, an example of a dialogue of a conventional speech dialogue system 90 will be described with reference to FIGS. 1 and 2.

Figure 1:
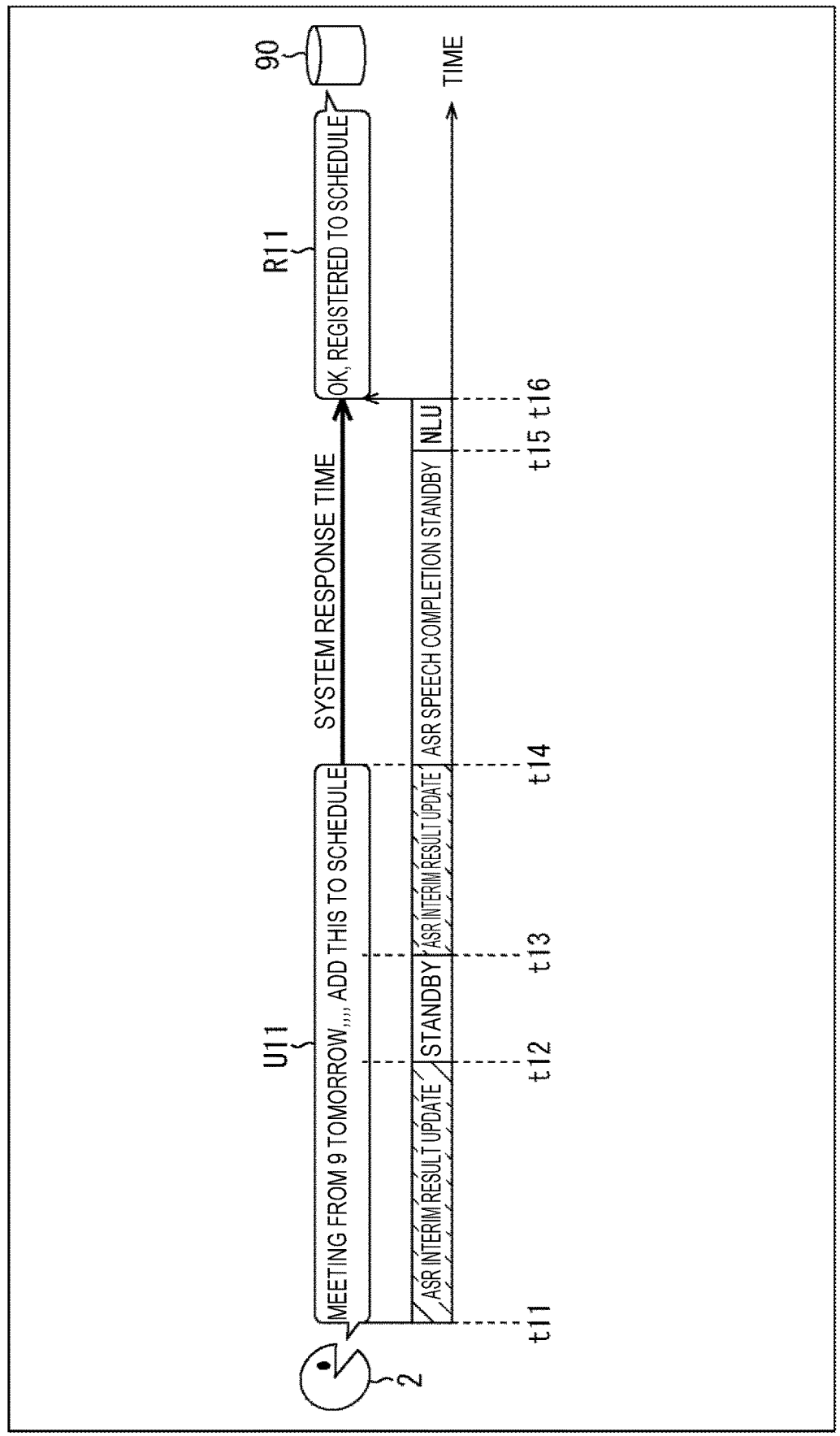
FIG. 1 is a diagram illustrating an example of a dialogue of a conventional speech dialogue system.

In FIG. 1, in a case in which a user 2 performs a speech U11 saying "meeting from 9 tomorrow , , , add this to the schedule", in the conventional speech dialogue system 90, in times t11 to t12, speech recognition processing is performed using a speech saving "meeting from 9 tomorrow", and an interim result of the speech recognition (ASR: Automatic Speech Recognition) is updated.

In addition, in the conventional speech dialogue system 90, because there is a pause between a time when the speech saying "meeting from 9 tomorrow" ends and a time when a speech saying "add this to the schedule" is started, during the pause, the detection of user speech completion of speech recognition (ASR) is waited. For example, a speech recognition engine detects the completion of a user speech on the basis of the fact that a voice input of the user 2 is not performed for about 1 to 2 seconds.

Here, because a speech is performed by the user 2 before the completion of the user speech is detected, in the conventional speech dialogue system 90, in times t13 to t14, speech recognition processing is performed using the speech saying "add this to the schedule", and an interim result of the speech recognition (ASR) (ASR interim result) is updated.

After that, in the conventional speech dialogue system 90, by further waiting for user speech completion, user speech completion is detected at a time t15. Then, in the conventional speech dialogue system 90, in times t15 to t16, semantic analysis processing is performed using a result of speech recognition (ASR), and on the basis of a result of the semantic analysis (NLU: Natural Language Understanding), "meeting" is registered to "9 tomorrow" as a "schedule item" of the user 2, and a response R11 saying "OK, registered to the schedule" is made.

In this manner, in the conventional speech dialogue system 90, because it is necessary to wait for the detection of user speech completion of speech recognition (ASR), as a system response time (e.g. a time from times t14 to t16 in FIG. 1), a certain amount of time (e.g. several seconds) is required. Thus, a time of a system response gets delayed.

As a result, a turn of the dialogue gets delayed, and the user 2 feels stress. Furthermore, by repeatedly experiencing waiting for a system response for several seconds after the speech of itself, the user 2 only performs a speech like a voice command in consideration of a turn of the dialogue. Here, the above-described voice command means a user emitting a specific command using a voice, and means that the command is not a natural speech performed by the user.

On the other hand, in the conventional speech dialogue system 90, it is considered to shorten a standby time of user speech completion of speech recognition (ASR), but when the standby time is uniformly shortened, there is a possibility that the system determines user speech completion at a timing unintended by the user 2, and returns a system response that is different from a speech intention of the user 2.

Figure 2:
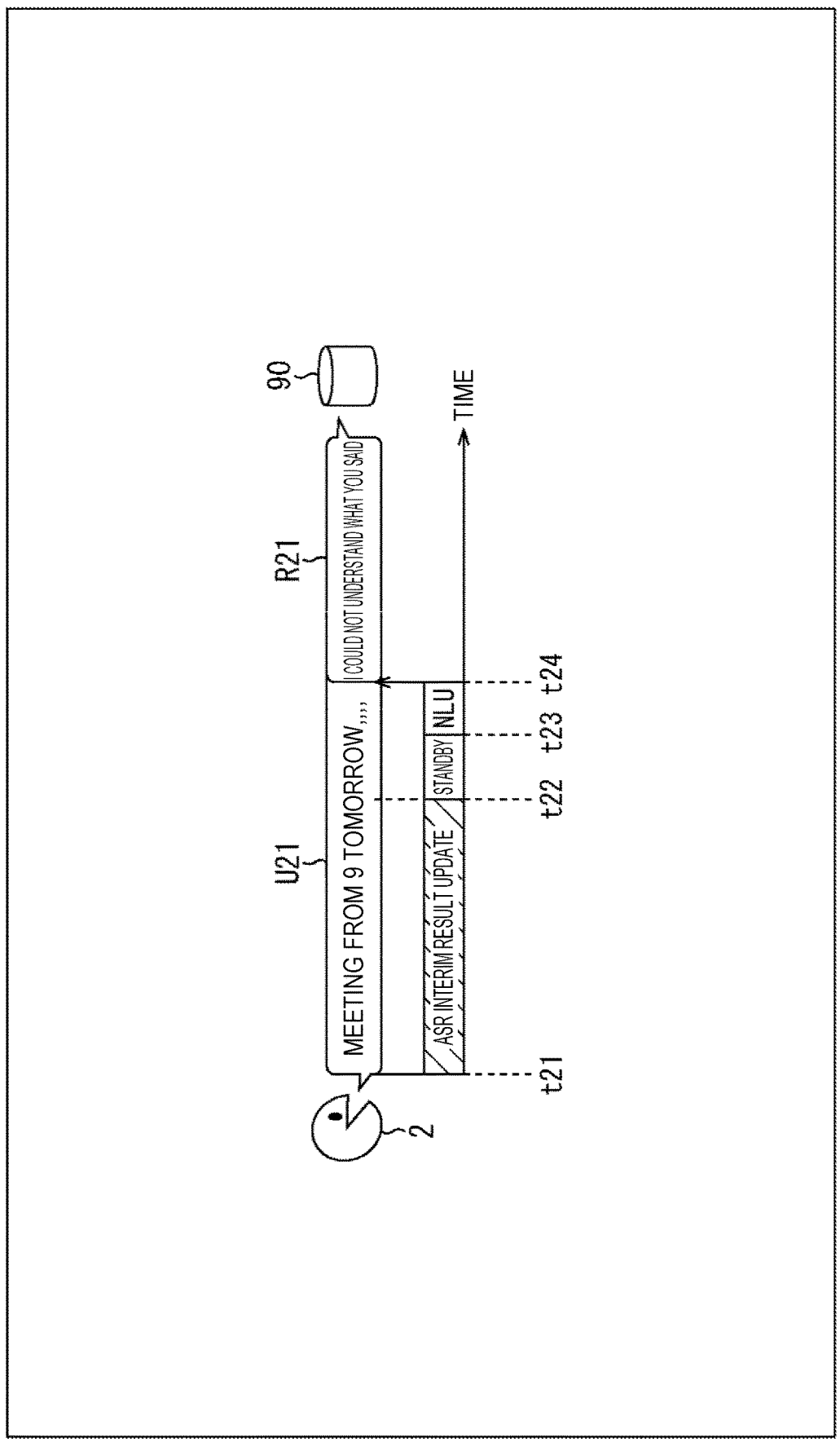
FIG. 2 is a diagram illustrating an example of a dialogue of a conventional speech dialogue system.

For example, as illustrated in FIG. 2, in the conventional speech dialogue system 90, in times t21 to t22, speech recognition processing is performed using a speech U21 saying "meeting from 9 tomorrow", and after an interim result of the speech recognition (ASR) (ASR interim result) is updated, the system waits for a only a short standby time (time from times t22 to t23), and immediately performs semantic analysis processing.

In this case, a system response time (time from times t22 to t23 in FIG. 2) can be shortened as compared with the system response time illustrated in FIG. 1 (time from times t14 to t16 in FIG. 1), but the intention of the user 2 fails to be understood, and a response R21 saying "I could not understand what you said" is made.

In this manner, in the conventional speech dialogue system 90, even if a standby time of user speech completion of speech recognition (ASR) is set to a short time, there is a possibility that a system response that is different from the speech intention of the user 2 is returned.

As a result, the user 2 who has received the unintended response from the system needs to perform a speech again from the beginning. In addition, for avoiding such a situation, the user 2 needs to perform a speech to the system without making a pause (in the same breath), and a speech burden on the user 2 becomes large.

As described above, in the conventional speech dialogue system 90, there has been such a problem that a responsivity of a system response becomes slow due to the user speech completion standby performed by speech recognition (ASR). In addition, in the case of deciding a pause time using only a word order of a speech, as disclosed in Patent Literature 1 described above, because a situation of a dialogue with a user is not considered, there is a possibility that the completion of a user speech fails to be correctly detected, depending on the situation. As a result, there is concern that a responsivity of a system response becomes slow.

In view of the foregoing, hereinafter, a speech dialogue system to which the present technology is applied, and which enables speeding up of a responsivity of a system response to a speech of a user will be described.

2. Embodiment of Present Technology

Configuration Example of Speech Dialogue System

Figure 3:
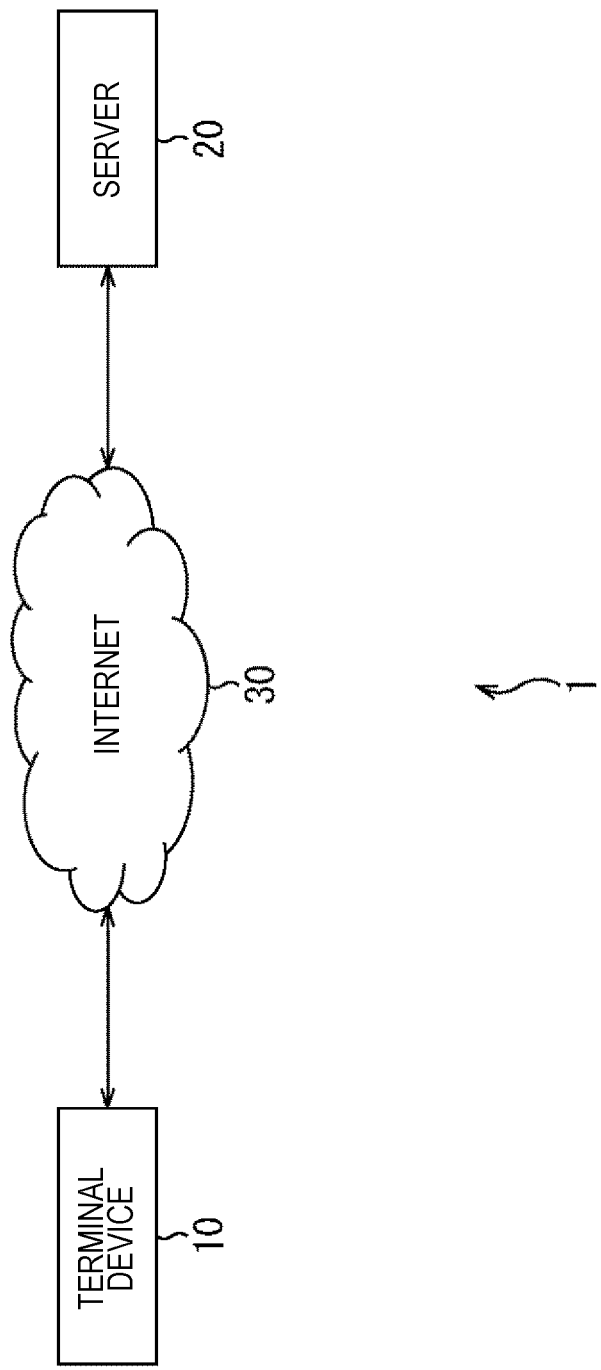
FIG. 3 is a block diagram illustrating an example of a configuration of a speech dialogue system to which the present technology is applied.

FIG. 3 is a block diagram illustrating an example of a configuration of a speech dialogue system to which the present technology is applied.

A speech dialogue system 1 includes a terminal device 10 that is installed on a local side such as a user's home, and functions as a user interface of a speech dialogue service, and a server 20 that is installed on a cloud side such as a data center, and performs processing for implementing a speech dialogue function. In the speech dialogue system 1, the terminal device 10 and the server 20 are connected to each other via an internet 30.

For example, the terminal device 10 is a speaker that can be connected to a network such as a home local area network (LAN), and is also referred to as a smart speaker, a home agent, and the like. Aside from the replay of music, a speaker of this type has functions of a speech dialogue with a user, a voice operation of a device such as a lighting device and an air conditioner, and the like, for example.

Moreover, the terminal device 10 is not limited to the speaker, and may be formed as a game machine, a mobile device such as a smartphone and a mobile phone, a tablet computer, or the like, for example.

By cooperating with the server 20 via the internet 30, the terminal device 10 can provide a user with (a user interface of) the speech dialogue service.

For example, the terminal device 10 collects a voice (user speech) emitted by a user, and transmits the voice data to the server 20 via the internet 30. In addition, the terminal device 10 receives processing data transmitted from the server 20 via the internet 30, and outputs information such as a voice corresponding to the processing data.

The server 20 is a server (information processing device) that provides a cloud-based speech dialogue service.

For example, the server 20 performs processing such as speech recognition processing and semantic analysis processing on the basis of voice data transmitted from the terminal device 10 via the internet 30, and transmits processing data corresponding to a result of the processing, to the terminal device 10 via the internet 30.

Functional Configuration Example of Speech Dialogue System

Figure 4:
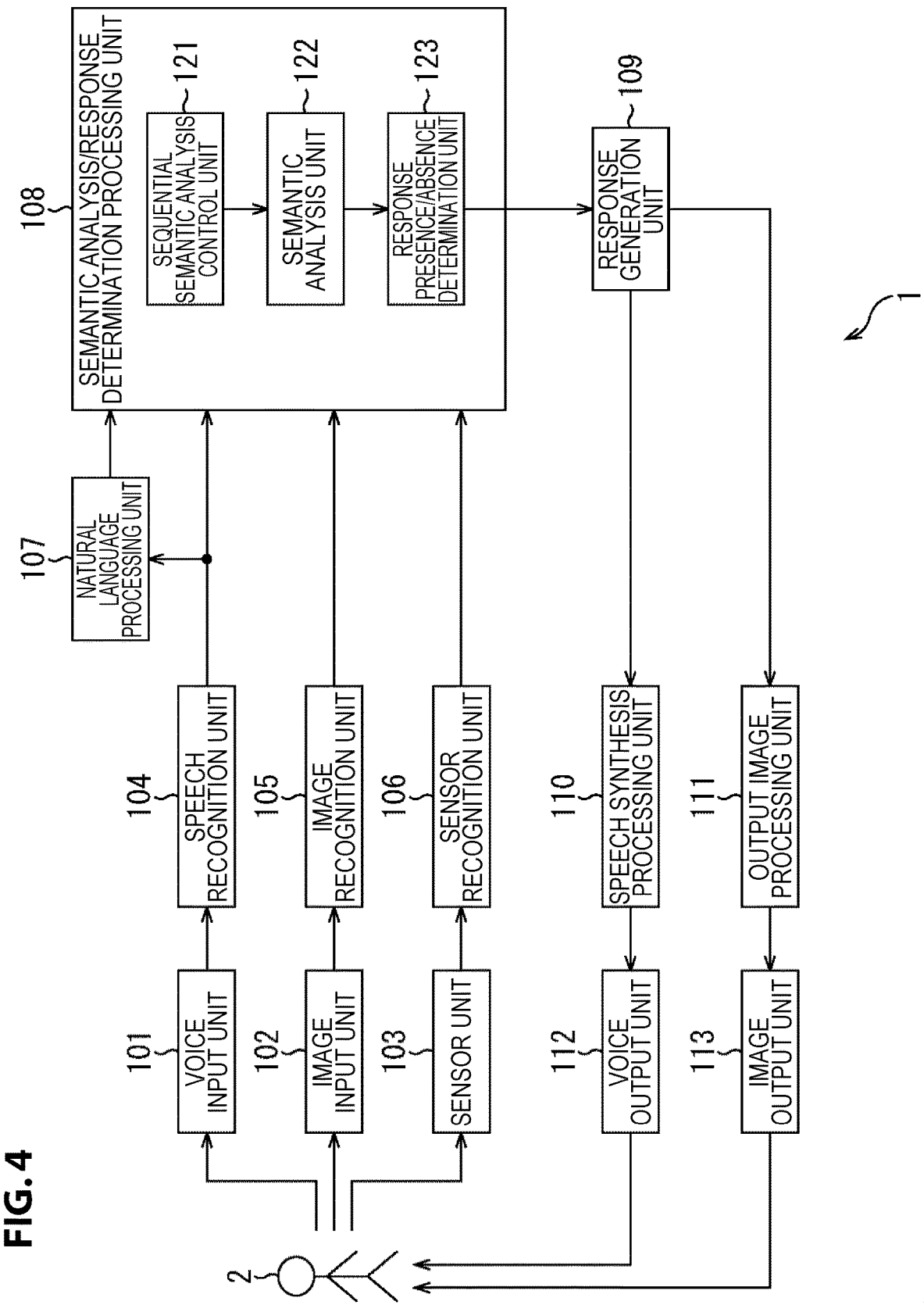
FIG. 4 is a block diagram illustrating an example of a functional configuration of the speech dialogue system to which the present technology is applied.

FIG. 4 is a block diagram illustrating an example of a functional configuration of the speech dialogue system to which the present technology is applied.

In FIG. 4, the speech dialogue system 1 includes a voice input unit 101, an image input unit 102, a sensor unit 103, a speech recognition unit 104, an image recognition unit 105, a sensor recognition unit 106, a natural language processing unit 107, a semantic analysis/response determination processing unit 108, a response generation unit 109, a speech synthesis processing unit 110, an output image processing unit 111, a voice output unit 112, and an image output unit 113.

The voice input unit 101 includes a voice input device such as a microphone, for example. The voice input unit 101 supplies, to the speech recognition unit 104, voice data obtained by converting a voice emitted by a user 2, into an electrical signal.

The image input unit 102 includes an image input device such as a camera that includes an image sensor, for example. The image input unit 102 supplies, to the image recognition unit 105, image data obtained by capturing an image of a subject such as the user 2.

The sensor unit 103 includes a sensor device such as various types of sensors, for example. The sensor unit 103 performs sensing of the user 2, a surrounding thereof, and the like, and supplies, to the sensor recognition unit 106, sensor data corresponding to the sensing result.

Here, as the sensor unit 103, for example, a biosensor that detects biological information such as aspiration, a pulsebeat, a fingerprint, and iris, a magnetic sensor that detects a size and a direction of a magnetizing field (magnetic field), an acceleration sensor that detects acceleration, a gyro sensor that detects an angle (attitude), angular velocity, and angular acceleration, a proximity sensor that detects an object that approaches, and the like can be included.

In addition, the sensor unit 103 may be a brain wave sensor that is attached to a head portion of the user 2, and detects brain waves by measuring an electric potential or the like. Furthermore, the sensor unit 103 can include a sensor for measuring a surrounding environment, such as a temperature sensor that detects temperature, a humidity sensor that detects humidity, and an environmental light sensor that detects brightness of the surrounding, and a sensor for detecting position information such as a Global Positioning System (GPS) signal.

On the basis of the voice data to be supplied from the voice input unit 101, the speech recognition unit 104 performs speech recognition processing, and supplies a result of the speech recognition to the natural language processing unit 107 and the semantic analysis/response determination processing unit 108.

In the speech recognition processing, for example, processing of converting the voice data from the voice input unit 101 into text data (speech sentence) by referring to a database for speech-text conversion or the like is performed.

In addition, in the speech recognition processing, for example, processing for extracting a result of speech recognition that is to be used in subsequent sequential semantic analysis control processing, such as processing of analyzing (a signal waveform of) the voice data from the voice input unit 101, is performed on the voice data.

Moreover, in the following description, in the speech recognition processing to be performed by the speech recognition unit 104, speech recognition for obtaining text data (speech sentence) of a speech of the user 2 will be described as "speech recognition (ASR: Automatic Speech Recognition)", and will be distinguished from a result of speech recognition that is to be used for determining a timing of inputting an interim result of speech recognition (ASR) (hereinafter, will also be referred to as an ASR interim result) to semantic analysis processing in the subsequent sequential semantic analysis control processing.

On the basis of the image data to be supplied from the image input unit 102, the image recognition unit 105 performs image recognition processing, and supplies a result of the image recognition to the semantic analysis/response determination processing unit 108. In the image recognition processing, processing for extracting a result of the image recognition that is to be used in the subsequent sequential semantic analysis control processing is performed on the image data.

On the basis of the sensor data to be supplied from the sensor unit 103, the sensor recognition unit 106 performs sensor recognition processing, and supplies a result of the sensor recognition to the semantic analysis/response determination processing unit 108. In the sensor recognition processing, processing for extracting a result of the sensor recognition that is to be used in the subsequent sequential semantic analysis control processing is performed on the sensor data.

On the basis of a result of speech recognition (ASR) that is to be supplied from the speech recognition unit 104, the natural language processing unit 107 performs natural language processing, and supplies a result of the natural language recognition (natural language analysis) to the semantic analysis/response determination processing unit 108.

In the natural language processing (NLP: Natural Language Processing), for example, processing of determining a word class or the like of a morpheme, and analyzing a relation between separated morphemes and the like is performed by morphological analysis, syntax analysis, and the like.

Together with a result of the speech recognition (ASR) performed by the speech recognition unit 104 (ASR interim result), the result of the speech recognition from the speech recognition unit 104, the result of the image recognition from the image recognition unit 105, the result of the sensor recognition from the sensor recognition unit 106, and the result of the natural language recognition from the natural language processing unit 107 are supplied to the semantic analysis/response determination processing unit 108.

In the semantic analysis/response determination processing unit 108, on the basis of the result of the speech recognition, the result of the image recognition, the result of the sensor recognition, and the result of the natural language recognition, semantic analysis processing is performed on the result of speech recognition (ASR) (ASR interim result), and on the basis of a result of the semantic analysis, the presence or absence of a response is determined, and a result of the response presence/absence determination is supplied to the response generation unit 109.

The semantic analysis/response determination processing unit 108 includes a sequential semantic analysis control unit 121, a semantic analysis unit 122, and a response presence/absence determination unit 123.

On the basis of the result of the speech recognition, the result of the image recognition, the result of the sensor recognition, and the result of the natural language recognition, the sequential semantic analysis control unit 121 performs sequential semantic analysis control processing, and controls semantic analysis processing to be performed by the semantic analysis unit 122.

In the sequential semantic analysis control processing, on the basis of at least one result of recognition among the result of the speech recognition, the result of the image recognition, the result of the sensor recognition, or the result of the natural language recognition, a timing of an input of an ASR interim result to semantic analysis processing is determined when a time of a tiny pause of a speech exceeds a fixed time, for example, and the ASR interim result is input to semantic analysis processing. Moreover, the details of the sequential semantic analysis control processing will be described later with reference to FIG. 6 and the like.

On the basis of the ASR interim result to be supplied from the sequential semantic analysis control unit 121, the semantic analysis unit 122 performs semantic analysis processing, and supplies a result of the semantic analysis (NLU: Natural Language Understanding) to the response presence/absence determination unit 123.

In the semantic analysis processing, processing of converting an interim result (text data) of speech recognition (ASR) that is a natural language, into an expression understandable to a machine (system) by referring to a database for speech language understanding or the like, for example is performed.

Here, as a result of the semantic analysis (NLU), the meaning of the speech is expressed in the form of an "intention (Intent)" desired by the user to be executed, and "entity information (Entity)" that serves as a parameter thereof. Moreover, in the following description, by describing an intention to be obtained as a result of the semantic analysis (NLU) performed for the ASR interim result, as an "intention (Intent)" or "Intent", the intention will be distinguished from the intention of the speech of the user 2.

On the basis of the result of the semantic analysis (NLU) that is to be supplied from the semantic analysis unit 122, the response presence/absence determination unit 123 performs response presence/absence determination processing, and supplies a result of the response presence/absence determination to the response generation unit 109.

In the response presence/absence determination processing, on the basis of a result (Intent, Entity) of semantic analysis (NLU) performed on the ASR interim result, for example, whether or not to make a system response (response) is determined depending on whether or not the intention is a function of the system that follows a situation of a dialogue with the user 2, whether or not the intention is an intention (Intent) of a request that can be accepted as a function of the system, or the like. Moreover, the details of the response presence/absence determination processing will be described later with reference to FIGS. 7 to 10, and the like.

On the basis of the result of the response presence/absence determination that is to be supplied from (the response presence/absence determination unit 123 of) the semantic analysis/response determination processing unit 108, the response generation unit 109 performs response generation processing, and supplies a result of the response generation to the speech synthesis processing unit 110 or the output image processing unit 111.

In the response generation processing, in a case in which it is determined by the response presence/absence determination processing that a system response (response) is to be made, a system response corresponding to the result (Intent, Entity) of semantic analysis (NLU) (e.g. response corresponding to a function of the system that is to be executed on the basis of the result of semantic analysis (NLU)) is generated.

On the basis of the result of the response generation that is to be supplied from the response generation unit 109, the speech synthesis processing unit 110 performs speech synthesis processing, and supplies a result of the speech synthesis to the voice output unit 112.

On the basis of the result of the response generation that is to be supplied from the response generation unit 109, the output image processing unit 111 performs output image processing, and supplies a result of the output image to the image output unit 113.

The voice output unit 112 includes a voice output device such as a speaker and headphones, for example. On the basis of a result of the speech synthesis that is to be supplied from the speech synthesis processing unit 110, the voice output unit 112 outputs a sound corresponding to the voice data, as a system response (response).

The image output unit 113 includes an image output device such as a liquid crystal display or an organic EL display, for example. On the basis of a result of the output image that is to be supplied from the output image processing unit 111, the image output unit 113 outputs (displays) an image corresponding to the image data, as a system response (response).

The speech dialogue system 1 has the above-described configuration.

Moreover, in the speech dialogue system 1 in FIG. 4, structural elements from the voice input unit 101 to the image output unit 113 can be arbitrarily incorporated into either device of the terminal device 10 (FIG. 1) and the server 20 (FIG. 1). For example, the following configuration can be employed.

More specifically, while the voice input unit 101, the image input unit 102, the sensor unit 103, the voice output unit 112, and the image output unit 113 that function as a user interface can be incorporated into the terminal device 10 provided on the local side, the speech recognition unit 104, the image recognition unit 105, the sensor recognition unit 106, the natural language processing unit 107, the semantic analysis/response determination processing unit 108, the response generation unit 109, the speech synthesis processing unit 110, and the output image processing unit 111 that have other functions can be incorporated into the server 20 provided on the cloud side.

At this time, the speech recognition unit 104, the image recognition unit 105, the sensor recognition unit 106, the natural language processing unit 107, the semantic analysis/response determination processing unit 108, the response generation unit 109, the speech synthesis processing unit 110, and the output image processing unit 111 are implemented by a central processing unit (CPU) of the server 20 executing programs, for example.

In addition, for exchanging data via the internet 30, the terminal device 10 and the server 20 each include a communication I/F including a communication interface circuit or the like, which is not illustrated in the drawing. With this configuration, during the speech of the user 2, the terminal device 10 and the server 20 can perform communication via the internet 30, and on the server 20 side, processing such as the sequential semantic analysis control processing or the response presence/absence determination processing can be performed on the basis of a result of recognition from the terminal device 10.

Furthermore, the terminal device 10 may have the following configuration. For example, an input unit including a button, a keyboard, and the like is provided so that an operation signal corresponding to an operation of the user 2 can be obtained. Alternatively, the image output unit 113 is formed as a touch panel in which a touch sensor and a display unit are integrated, so that an operation signal corresponding to an operation performed by the user 2 using a finger or a touch pen (stylus pen) can be obtained.

Flow of Speech Dialogue Processing

Next, a flow of speech dialogue processing to be executed by the speech dialogue system 1 will be described with reference to a flowchart in FIG. 5.

The speech dialogue processing is executed when a speech is started by the user 2 existing near the terminal device 10. Moreover, here, when the user 2 starts a speech, for example, an explicit instruction for starting the speech may be issued by a call that uses a specific keyword (so-called activation word), plosive sound produced by clapping hands, or the like.

In step S11, the voice input unit 101 receives a speech of the user 2 by collecting a voice emitted by the user 2.

In step S12, a recognition unit such as the speech recognition unit 104 performs recognition processing during the user speech on the basis of data from a preceding input unit such as the voice input unit 101.

Here, for example, speech recognition processing is performed by the speech recognition unit 104 on the basis of the voice data from the voice input unit 101, and a result of speech recognition (ASR) (ASR interim result) is obtained.

In addition, among speech recognition processing to be performed by the speech recognition unit 104, image recognition processing to be performed by the image recognition unit 105, or sensor recognition processing to be performed by the sensor recognition unit 106, at least one type of recognition processing is performed, and a result of recognition that is to be used in the subsequent sequential semantic analysis control processing (S13) is obtained. Moreover, here, natural language processing may be performed by the natural language processing unit 107, and a result of the natural language recognition may be obtained.

In step S13, on the basis of the result of recognition (a result of recognition of each input unit) that is obtained in the process in step S12, the sequential semantic analysis control unit 121 performs sequential semantic analysis control processing, and performs input control of an interim result of speech recognition (ASR) (ASR interim result) to semantic analysis processing (S15).

When a time of a tiny pause of the speech exceeds a fixed time, when a reliability score exceeds a fixed threshold value, or the like, for example, a timing of an input of the ASR interim result to the semantic analysis processing is determined by the sequential semantic analysis control processing ("YES" in S14) and the interim result of speech recognition (ASR) (ASR interim result) is input to the semantic analysis processing.

In a case in which it is determined by the input control to be performed in the process in step S13 that it is not the timing of the input of the ASR interim result to the semantic analysis processing ("NO" in S14), the processing returns to step S11, and the above-described processes are repeated. On the other hand, in a case in which it is determined that it is the timing of the input of the ASR interim result to the semantic analysis processing ("YES" in S14), the processing is advanced to step S15.

In step S15, the semantic analysis unit 122 performs the semantic analysis processing on the ASR interim result input in the process in step S13.

By the semantic analysis processing, processing of converting the ASR interim result (text data) expressed in a natural language, into an expression understandable to the machine (system) is performed. A result (Intent, Entity) of semantic analysis (NLU) is thereby obtained from the ASR interim result.

In step S16, on the basis of the result (Intent, Entity) of semantic analysis (NLU) that is obtained in the process in step S15, the response presence/absence determination unit 123 determines whether or not to make a system response.

In a case in which it is determined in step S16 that a system response is not to be made, the processing returns to step S11, and the above-described processes in steps S11 to S16 are repeated.

More specifically, by the processes in steps S11 to S16 being repeated, input control of the ASR interim result to semantic analysis processing is performed, and a result (Intent, Entity) of semantic analysis (NLU) performed on the ASR interim result is sequentially obtained. With this configuration, each time a result of semantic analysis (NLU) performed on an ASR interim result is obtained, determination processing of a system response is repeatedly performed by the response presence/absence determination unit 123. Here, for example, at a time point at which a result (Intent, Entity) of semantic analysis (NLU) by which a function of the system that follows a situation of a dialogue can be executed is obtained, it is determined that a system response is to be made.

Then, in a case in which it is determined in step S16 that a system response is to be made, the processing is advanced to step S17.

In step S17, the response generation unit 109 generates a system response corresponding to the result (Intent, Entity) of semantic analysis (NLU) that is obtained in the process in step S15. Here, for example, a system response corresponding to a function (e.g. e-mail processing function, weather check function, etc.) of the system that is to be executed on the basis of the result of semantic analysis (NLU) is generated.

In step S18, on the basis of a result of the response generation that is obtained in the process in step S17, the speech synthesis processing unit 110 performs speech synthesis processing, and outputs a voice of a system response that is to be thereby obtained, from the voice output unit 112. The system response is thereby presented to the user 2.

Moreover, here, aside from outputting the voice synthesized by the speech synthesis processing unit 110, as a system response, an output image generated by the output image processing unit 111 or the like may be output.

Furthermore, the system response is not limited to voice information or a visual information, and may be presented by tactile sense by a device (e.g. smartphone, wearable device, etc.) worn by the user 2 vibrating, for example.

Hereinbefore, a flow of the speech dialogue processing has been described.

In the speech dialogue processing (FIG. 5) executed by the speech dialogue system 1, a speech of the user 2 is subjected to the speech recognition processing through the voice input unit 101 such as a microphone, and content of the speech is converted into text and sent to the sequential semantic analysis control unit 121. The speech recognition processing is constantly performed during the speech of the user 2, and text data (ASR interim result) that can be recognized during the speech is sequentially sent to the sequential semantic analysis control unit 121.

In addition, the speech recognition processing may not only convert the speech content of the user 2 into text, but also perform detection of a rhythm of an input voice such as pitch extraction of the speech, and sequentially send the detected rhythm to the sequential semantic analysis control unit 121.

Furthermore, aside from the voice of the speech of the user 2, image data obtained by capturing an image of the user 2 or the surrounding thereof can be subjected to image recognition processing through the image input unit 102 such as a camera, and the orientation of a face of the user 2, or the like can be recognized. Alternatively, visual line information or the like of the user 2 can be subjected to sensor recognition processing through the sensor unit 103, and a visual line direction or the like of the user 2 can be recognized.

These types of recognition processing are constantly performed during the speech of the user 2, and results of the recognition are sequentially sent to the sequential semantic analysis control unit 121.

Then, in the speech dialogue processing (FIG. 5) executed by the speech dialogue system 1, by inputting an ASR interim result to semantic analysis processing each time an input timing of an ASR interim result is determined on the basis of a speech situation (e.g. a tiny pause of the speech, reliability of speech recognition (ASR), etc.) obtained from a result of recognition, an intention (Intent) and entity information (Entity) that are to be obtained as a result of the semantic analysis (NLU) are sequentially acquired. Here, for example, a system response is returned to the user 2 at a time point at which an intention (Intent) and entity information (Entity) by which the speech dialogue system 1 can execute a function (action) that follows a situation of a dialogue are obtained.

Moreover, in the speech dialogue system 1, for example, when a result (Intent, Entity) of semantic analysis (NLU) that corresponds to a function that does not follow a situation of a dialogue is obtained, a system response is not returned, and speech recognition (ASR) of the speech of the user 2 is continued.

Sequential Semantic Analysis Control Processing

Next, the detailed content of the sequential semantic analysis control processing to be executed by the sequential semantic analysis control unit 121 will be described.

By the sequential semantic analysis control unit 121 performing sequential semantic analysis control processing on the basis of results of recognition that are sequentially sent from the speech recognition unit 104, the image recognition unit 105, the sensor recognition unit 106, and the natural language processing unit 107 during the speech of the user 2, an input timing of the ASR interim result is determined.

In the sequential semantic analysis control processing, on the basis of one condition or a combination of a plurality of conditions among conditions (A) to (G) listed below, for example, a timing of an input of an ASR interim result to semantic analysis processing is determined.

(A) When a time of a tiny pause of a speech exceeds a fixed time (B) When a reliability score exceeds a fixed threshold value (C) When a segment of a predicate indicating a request or a question is detected (D) When a specific wording is detected at a sentence end of a text (E) When intonation indicating a question is detected in speech prosody (F) When a face of the user is turned toward a device or turned away from the device (G) When the user looks toward the device or looks away from the device Moreover, the above-described conditions (A) to (G) are listed exemplary conditions for detecting a timing of an input of an ASR interim result to semantic analysis processing, and another condition may be used as long as a timing of an input to semantic analysis processing can be detected.

(A) First Condition

Figure 6:
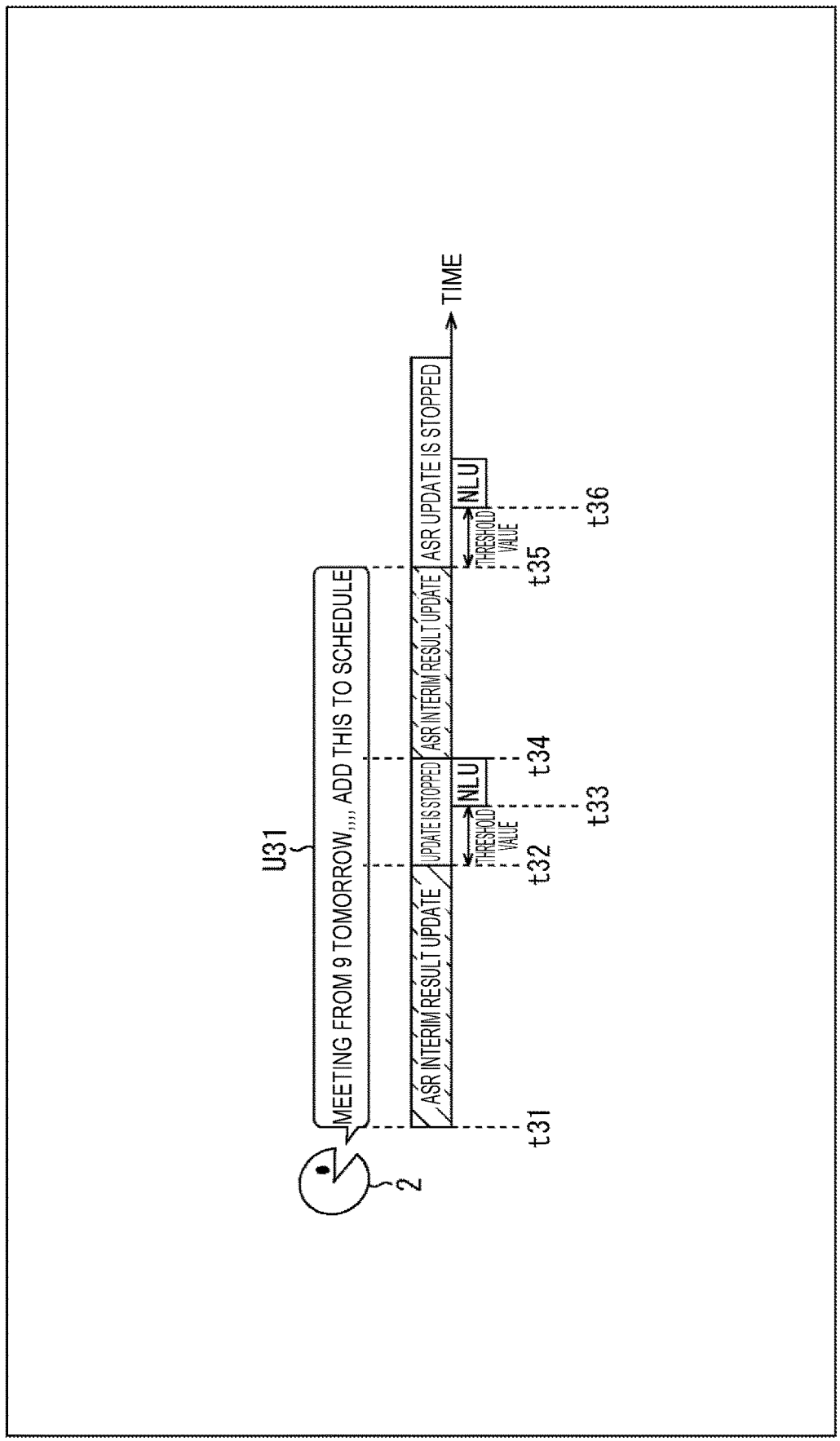
FIG. 6 is a diagram illustrating an example of detection of a semantic analysis input timing that is performed in a case in which a first condition is used.

Here, in a case in which a first condition listed above as (A) is used, "when a time of a tiny pause of a speech exceeds a fixed time", an input to semantic analysis processing is detected. FIG. 6 illustrates a specific example of this case.

In FIG. 6, in a case in which the user 2 performs a speech U31 saying "meeting from 9 tomorrow , , , add this to the schedule", when a time from when a speech saying "meeting from 9 tomorrow" ends to when a speech saying "add this to the schedule" is started exceeds a very small amount of time (e.g. about several hundreds of milliseconds), the speech dialogue system 1 determines that it is an input timing of an ASR interim result.

More specifically, in the speech dialogue system 1, a result of speech recognition (ASR) (text data of the speech) is sequentially output during the speech of the user 2, and in a case in which an interim result of a text that is to be sequentially output as a result of speech recognition (ASR) has not been updated for a time exceeding a threshold value (e.g. 300 ms), an input timing of an ASR interim result is determined. Then, by inputting, to the semantic analysis processing, an ASR interim result corresponding to a section from a start position of the speech (speech start position) to a target position of input timing determination (input determination position), an intention (Intent) and entity information (Entity) can be obtained as a result of semantic analysis (NLU).

In FIG. 6, in times t31 to t32, speech recognition processing is performed using the speech saying "meeting from 9 tomorrow" and an ASR interim result is updated, but after the time t32, the update of the ASR interim result is stopped, and even if the time elapsed from the time t32 exceeds a threshold value (threshold value time), the update of the ASR interim result is not performed. Thus, at a time t33, an input timing of an ASR interim result is determined, an ASR interim result saying "meeting from 9 tomorrow" is input to semantic analysis processing, and a result of semantic analysis (NLU) is obtained.

After that, in times t34 to t35, speech recognition processing is performed using a speech saying "add this to the schedule", and the ASR interim result is updated. Then, after the time t35, the update of the ASR interim result is stopped, and even if the time elapsed from the time t35 exceeds the threshold value, the update of the ASR interim result is not performed. Thus, at a time t36, an input timing of an ASR interim result is determined, an ASR interim result saying "add this to the schedule" is input to semantic analysis processing, and a result of semantic analysis (NLU) is obtained.

In this manner, in the case of using the above-described first condition (A), for example, when a time of a pause of the speech such as a tiny pause exceeds a fixed time during the speech of the user 2, the sequential semantic analysis control unit 121 determines that it is an input timing of an ASR interim result, on the basis of a result of speech recognition performed by the speech recognition unit 104, and inputs the ASR interim result to semantic analysis processing to be performed by the semantic analysis unit 122.

(B) Second Condition

In the case of using the above-described second condition (B), for example, when a reliability score associated with an ASR interim result exceeds a fixed threshold value (i.e. when the ASR interim result indicates reliable content), on the basis of a result of speech recognition performed by the speech recognition unit 104, the sequential semantic analysis control unit 121 determines that it is an input timing of an ASR interim result, and inputs the ASR interim result to semantic analysis processing.

(C) Third Condition

In the case of using the above-described third condition (C), when a segment of a predicate indicating a request or a question that is included in an ASR interim result (text) is detected, on the basis of a result in a natural language that is to be obtained by inputting the ASR interim result to natural language processing, the sequential semantic analysis control unit 121 determines that it is an input timing of an ASR interim result, and inputs the ASR interim result to semantic analysis processing.

(D) Fourth Condition

In the case of using the above-described fourth condition (D), when a specific wording (e.g. "desu (suffix indicating formality)", "shimasu (another suffix indicating formality)", "douzo (suffix meaning "please")", etc.) is detected at a sentence end of an ASR interim result (text), the sequential semantic analysis control unit 121 determines that it is an input timing of an ASR interim result, and inputs the ASR interim result to semantic analysis processing.

(E) Fifth Condition

In the case of using the above-described fifth condition (E), for example, when intonation indicating a question (e.g. an end of a word that has rising intonation, etc.) is detected in speech prosody, on the basis of a result of speech recognition performed by the speech recognition unit 104, the sequential semantic analysis control unit 121 determines that it is an input timing of an ASR interim result, and inputs the ASR interim result to semantic analysis processing.

(F) Sixth Condition

In the case of using the above-described sixth condition (F), for example, when it is detected that a face of the user 2 is turned toward the terminal device 10 or when it is detected the face of the user 2 is turned away from the terminal device 10, during the speech of the user 2, on the basis of a result of image recognition performed by the image recognition unit 105, the sequential semantic analysis control unit 121 determines that it is an input timing of an ASR interim result, and inputs the ASR interim result to semantic analysis processing.

Moreover, here, the orientation of the face of the user 2 during the speech may be detected on the basis of a result of sensor recognition performed by the sensor recognition unit 106, in place of the result of image recognition.

(G) Seventh Condition

In the case of using the above-described seventh condition (G), for example, when it is detected that the user 2 looks toward the terminal device 10 or when it is detected that the user 2 looks away from the terminal device 10, during the speech of the user 2, on the basis of a result of image recognition performed by the image recognition unit 105, the sequential semantic analysis control unit 121 determines that it is an input timing of an ASR interim result, and inputs the ASR interim result to semantic analysis processing.

Moreover, here, the direction of a visual line of the user 2 during the speech may be detected on the basis of a result of sensor recognition performed by the sensor recognition unit 106, in place of the result of image recognition.

Another Example of Input Timing Determination

Moreover, as another condition other than the above-described conditions (A) to (G), for example, when a result of the following recognition is obtained, the speech dialogue system 1 may determine an input timing of an ASR interim result on the basis of the result of the recognition.

As a first another example, in a case in which it is recognized from a result of image recognition (image information) that a plurality of users exists around a target device (e.g. the terminal device 10), when it is recognized that the users start a conversation during the speech to the system, an input of an ASR interim result to semantic analysis processing may be stopped.

In this example, the start of the conversation to be made between the users can be recognized on the basis of a result of image recognition from the orientation of the face or the body of each user, a direction of the visual line, or the like, for example. In addition, the stop of the input of the ASR interim result to semantic analysis processing here means that the speech dialogue system 1 stops making a system response.

As a second another example, on the basis of a result of image recognition or cooperation with an external device, when it is recognized that the user 2 is not performing a speech to a target device (e.g. the terminal device 10), such as a time when the user starts to talk on a telephone or an intercom, for example, an input of an ASR interim result to semantic analysis processing may be stopped.

In this example, the cooperation with an external device here means notifying that an external device such as a telephone or an intercom, for example, enters a talking state, via a network such as a home LAN. In addition, also in this example, the stop of the input of the ASR interim result to semantic analysis processing means that a system response is stopped.

In the above-described manner, in the speech dialogue system 1, when a speech is started by the user 2, sequential semantic analysis control processing is performed by the sequential semantic analysis control unit 121 using one condition or a combination of a plurality of conditions among the above-described first to seventh conditions, for example. In addition, in the speech dialogue system 1, when an input timing of an ASR interim result is determined by the sequential semantic analysis control processing, an ASR interim result corresponding to a section from a speech start position to an input determination position of an input timing is input to the semantic analysis processing to be performed by the semantic analysis unit 122.

Nevertheless, if the ASR interim result to be input to the semantic analysis processing is restricted only to the section from the speech start position to a determination target position, when a speech including a long sentence, a complex sentence, or the like is performed, a subsequent input timing is missed. Thus, for example, the following processing can be performed.

More specifically, in the sequential semantic analysis control processing, in a case in which the length of an ASR interim result to be input to the semantic analysis processing exceeds a fixed threshold value (in a case in which the length of an input sentence becomes long), an ASR interim result of a section from a position (previous input determination position) at which input timing determination has been performed the last time or earlier than the last time, to a position (current input determination position) at which input timing determination has been performed this time may be input to the semantic analysis processing.

Then, in the speech dialogue system 1, semantic analysis processing is performed on an ASR interim result to be sequentially input each time an input timing is determined, until the speech is completed by the user 2, and on the basis of a result (Intent, Entity) of semantic analysis (NLU) that is accordingly obtained, the presence or absence of a system response is determined.

In this manner, in the speech dialogue system 1, when "a speech situation in which a speech of the user 2 can possibly be completed" is detected during the speech of the user 2, semantic analysis processing is performed on a speech sentence obtained at the time point, in a so-called speculative manner. With this configuration, as compared with the conventional method (e.g. example in FIG. 1) of determining the completion of a speech on the basis of the fact that a voice input is not performed for about 1 to 2 seconds, for example, it becomes possible to understand the intention of the user 2 on the basis of the result of semantic analysis (NLU), in a faster time (e.g. a time faster by several times). Then, at this time, if the result of semantic analysis (NLU) conforms to the situation of the dialogue, a system response can be returned to the user 2.

Response Presence/Absence Determination Processing

Next, the detailed content of response presence/absence determination processing to be executed by the response presence/absence determination unit 123 will be described.

On the basis of a result of semantic analysis (NLU) that is to be obtained by semantic analysis processing being sequentially performed by the semantic analysis unit 122, the response presence/absence determination unit 123 performs response presence/absence determination processing, and determines that a system response is to be made, at a time point at which a result of semantic analysis (NLU) by which the speech dialogue system 1 (system) can execute a function (action) that follows a situation of a dialogue is obtained, for example.

First Example of Response Presence/Absence Determination

Figure 7:
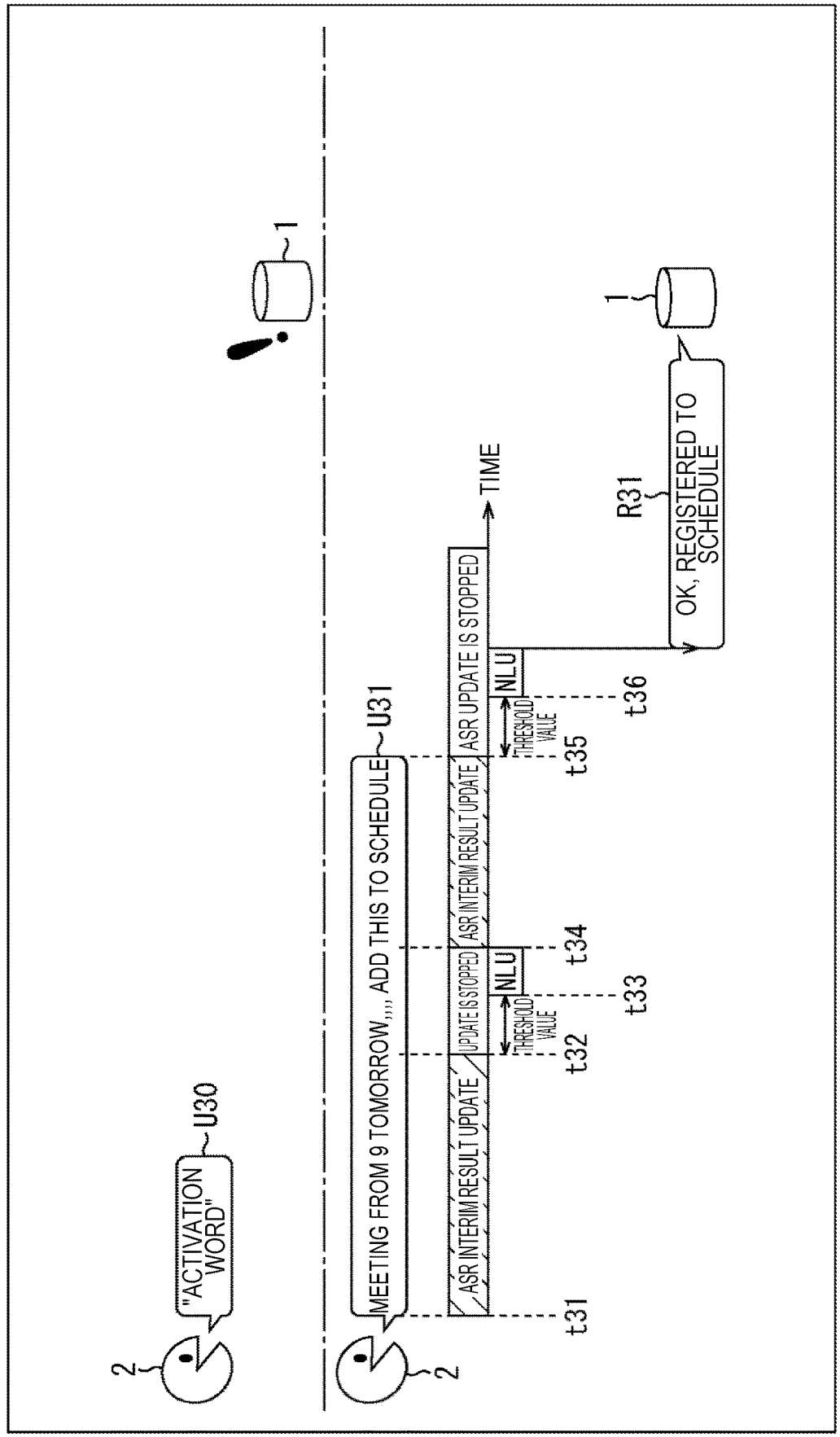
FIG. 7 is a diagram illustrating a first example of response presence/absence determination.

FIG. 7 illustrates a first example of response presence/absence determination. Here, in the first example, the speech dialogue system 1 is assumed to have a schedule function of managing a schedule of the user, as one of functions thereof.

In FIG. 7, when the user 2 performs a speech U30 of an activation word, the speech dialogue system 1 recognizes the activation word pronounced by the user 2, and waits for a request of some sort from the user 2.

Then, in a case in which the user 2 performs a speech U31 saying "meeting from 9 tomorrow , , , add this to the schedule", when the update of an ASR interim result has not been updated for a time exceeding a threshold value (e.g. 300 ms), during a period from when a speech saying "meeting from 9 tomorrow" ends to when a speech saying "add this to the schedule" is started, the speech dialogue system 1 determines that it is an input timing of the ASR interim result.

More specifically, in FIG. 7, similarly to the above-described example in FIG. 6, in times t31 to t32, speech recognition processing is performed using the speech saying "meeting from 9 tomorrow", and an ASR interim result is updated, but after the time t32, the update of the ASR interim result is stopped. Thus, at the time t33, an input timing of an ASR interim result is determined, the ASR interim result is input to semantic analysis processing, and a result (Intent, Entity) of semantic analysis (NLU) is obtained. Moreover, here, an input timing is determined using the above-described first condition (A), but another condition may be used.

At this time, on the basis of the result of semantic analysis (NLU the response presence/absence determination unit 123 determines that a response is not to be made, because the result of semantic analysis (NLU) of the speech saying "meeting from 9 tomorrow" is not an intention (Intent) of a request that can be accepted as a function of the speech dialogue system 1 (system). Accordingly, at the time point, the speech dialogue system 1 has no reaction to the user 2.

After that, in FIG. 7, similarly to the above-described example in FIG. 6, in times t34 to t35, speech recognition processing is performed using a speech saying "add this to the schedule", and the update of the ASR interim result is restarted. Then, after the time t35, the update of the ASR interim result is stopped, at the time t36, an input timing of an ASR interim result is determined, the ASR interim result is input to semantic analysis processing, and a result of semantic analysis (NLU) is obtained.

At this time, the response presence/absence determination unit 123 obtains, as a result of semantic analysis (NLU) of the speech saying "meeting from 9 tomorrow , , , add this to the schedule", Intent="schedule registration" and Entity="9 tomorrow", "meeting", and determines that a response is to be made, because the intention is a request that can be accepted as a function of the speech dialogue system 1 (system).

Then, in the speech dialogue system 1, by the schedule function, processing for registering "meeting" to "9 tomorrow" as a "schedule item" of the user 2 is performed, and a response R31 saying "OK, registered to the schedule" is made to the user 2.

In this manner, in the example in FIG. 7, in a case in which the speech U31 saying "meeting from 9 tomorrow , , , add this to the schedule" is pronounced by the user 2, at the time point at which the speech is performed up to "meeting from 9 tomorrow", because a result of semantic analysis (NLU) is not an intention (Intent) of a request that can be accepted as a function of the system, a system response is not made, and after that, at the time point at which the speech is performed up to "add this to the schedule", the result becomes an intention (Intent) of a request that can be accepted as a function of the system. Thus, a system response is made at the time point.

With this configuration, in the speech dialogue system 1, as compared with the above-described conventional method (FIG. 1, FIG. 2), an appropriate response can be made faster than the conventional method at an appropriate timing.

Second Example of Response Presence/Absence Determination

Figure 8:
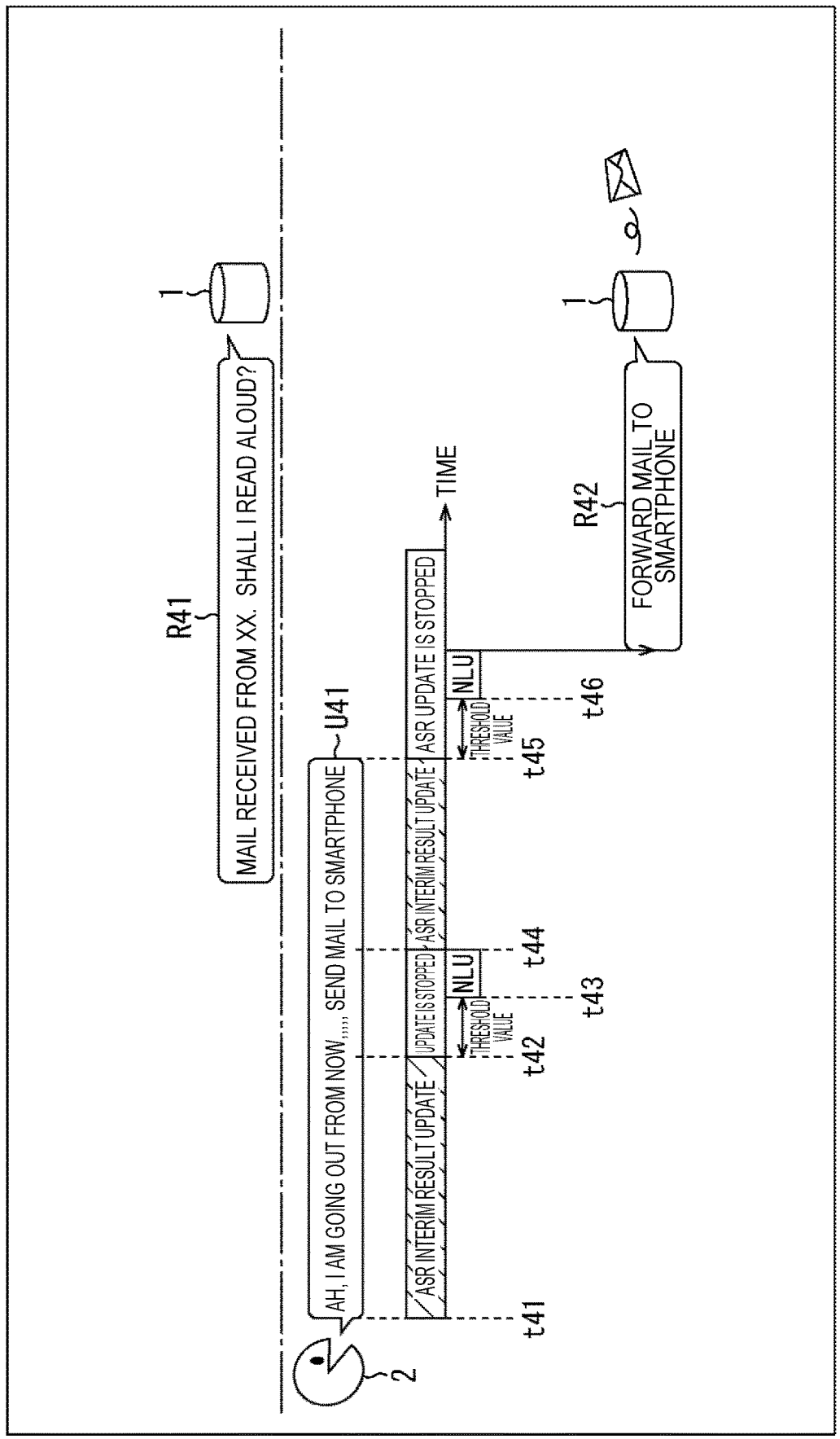
FIG. 8 is a diagram illustrating a second example of response presence/absence determination.

FIG. 8 is a diagram illustrating a second example of response presence/absence determination. Here, in the second example, the speech dialogue system 1 is assumed to have an e-mail processing function of controlling transmission/reception and forwarding of an e-mail, as one of functions thereof.

In FIG. 8, because the speech dialogue system 1 detects the reception of an e-mail addressed to the user 2, the speech dialogue system 1 performs a question R41 saying "A mail received from xx. Shall I read aloud?" to the user 2.

In a case in which the user 2 makes an answer U41 saying "Ah, I am going out from now , , , send the mail to the smartphone" to the question R41", when the update of an ASR interim result has not been updated for a time exceeding a threshold value (e.g. 300 ms), during a period from when a speech saying "Ah, I am going out from now," ends to when a speech saying "send the mail to the smartphone" is started, the speech dialogue system 1 determines that it is an input timing of an ASR interim result.

More specifically, in FIG. 8, in times t41 to t42, speech recognition processing is performed using the speech saying "Ah, I am going out from now,", and an ASR interim result is updated, but after the time t42, the update of the ASR interim result is stopped. Thus, at a time t43, an input timing of an ASR interim result is determined, the ASR interim result is input to semantic analysis processing, and a result (Intent, Entity) of semantic analysis (NLU) is obtained. Moreover, here, an input timing is determined using the above-described first condition (A), but another condition may be used.

At this time, on the basis of a result of semantic analysis (NLU), the response presence/absence determination unit 123 determines that a response is not to be made, because the result of semantic analysis (NLU) of the speech saying "Ah, I am going out from now," is not an intention that can execute a function of the system that follows a situation of a dialogue, as an answer to the question R41 (because the intention is not an intention (Intent) regarding the e-mail processing function). Accordingly, at the time point, the speech dialogue system 1 has no reaction to the user 2.

After that, in FIG. 8, in times t44 to t45, speech recognition processing is performed using a speech saying "send the mail to the smartphone", and the update of the ASR interim result is restarted. Then, after the time t45, the update of the ASR interim result is stopped, at a time t46, an input timing of an ASR interim result is determined, the ASR interim result is input to semantic analysis processing, and a result of semantic analysis (NLU) is obtained.

At this time, as a result of semantic analysis (NLU) of the speech saying "send the mail to the smartphone", the response presence/absence determination unit 123 obtains Intent="mail forwarding" and Entity="smartphone", and because the result follows the situation of the dialogue as an answer to the question R41, and can be executed as the e-mail processing function, the response presence/absence determination unit 123 determines that a response is to be made.

Then, in the speech dialogue system 1, a response R42 saying "forward the mail to the smartphone" is made to the user 2, and by the e-mail processing function, processing of forwarding the e-mail received from xx, to the smartphone owned by the user 2 is performed.

In axis manner, in the example in FIG. 8, in a case in which the answer U41 saying "Ah, I am going out front now , , , send the mail to the smartphone" is performed by the user 2, because the situation of the dialogue is involved with the question R41 asking how to process the e-mail, a system response is made at the time point at which Intent="mail forwarding" and Entity="smartphone", which are results of semantic analysis (NLU) that correspond to the e-mail processing function of the system, are obtained.

Third Example of Response Presence/Absence Determination

Figure 9:
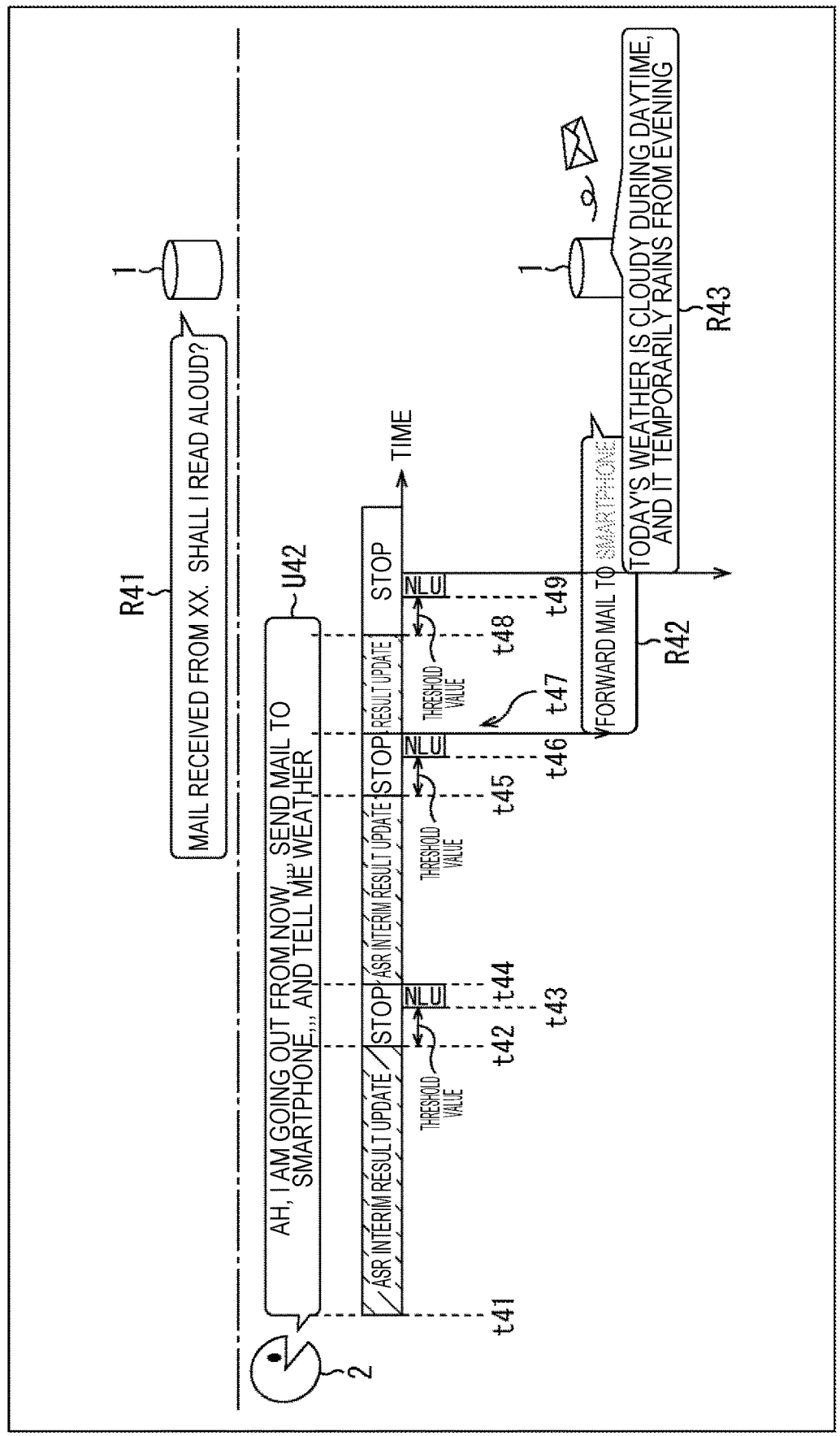
FIG. 9 is a diagram illustrating a third example of response presence/absence determination.

FIG. 9 is a diagram illustrating a third example of response presence/absence determination.

In FIG. 9, similarly to the above-described example in FIG. 8, the speech dialogue system 1 performs a question R41 saying "A mail received from xx. Shall I read aloud?".

To the question R41, the user 2 makes an answer U42 saying "Ah, I am going out from now , , , send the mail to the smartphone , , , and tell me the weather". At this time, in the speech dialogue system 1, similarly to the above-described example in FIG. 8, when the update of an ASR interim result has not been updated for a time exceeding a threshold value (e.g. 300 ms), during a period from when a speech saying "Ah, I am going out from now," ends to when a speech saying "send the mail to the smartphone" is started, an input timing of an ASR interim result is determined.

Thus, in FIG. 9, similarly to the above-described example in FIG. 8, at the time t43, an input timing of an ASR interim result is determined, and an ASR interim result saying "Ah, I am going out from now," is input to semantic analysis processing, but because a result of the semantic analysis (NLU) is not an intention (Intent) regarding the e-mail processing function, it is determined that a response is not to be made.

In addition, in FIG. 9, in the speech dialogue system 1, when the update of an ASR interim result has not been updated for a time exceeding a threshold value (e.g. 300 ms), during a period from when the speech saying "send the mail to the smartphone" ends to when a speech saying "and tell me the weather" is started, an input timing of an ASR interim result is determined.

Thus, in FIG. 9, similarly to the above-described example in FIG. 8, at the time t46, an input timing of an ASR interim result is determined, and an ASR interim result saying "send the mail to the smartphone" is input to semantic analysis processing. As a result of the semantic analysis (NLU), Intent="mail forwarding" and Entity="smartphone" are obtained, and because the intention is related to the e-mail processing function that follows the situation of the dialogue, forwarding of the e-mail and the response R42 thereof are instantly performed.

Furthermore, in FIG. 9, in times t47 to t48, speech recognition processing is performed using a speech saying "and tell me the weather", and the update of the ASR interim result is restarted. Then, after the time t48, the update of the ASR interim result is stopped, at a time t49, an input timing of an ASR interim result is determined, the ASR interim result is input to semantic analysis processing, and a result of semantic analysis (NLU) is obtained.

At this time, as a result of semantic analysis (NLU) of the speech saying "and tell me the weather", the response presence/absence determination unit 123 obtains Intent="weather check", and in a case in which an intention (intent) thereof is not related to the e-mail processing function that follows the situation of the dialogue, but is a function that can be executed as a function of the system, such an intention (Intent) can also be exceptionally accepted.

More specifically, in the third example, the answer U42 saying "Ah, I am going out from now , , , send the mail to the smartphone , , , and tell me the weather" includes the speech saying "Ah, I am going out from now,", and when an ASR interim result of the speech is input to semantic analysis processing, as a result of semantic analysis (NLU), Intent="going out" and Entity="now" are obtained. Then, from the result of the semantic analysis (NLU), the user 2 is expected to go out from now, and the information can be recorded as context information.

Then, after that, when Intent="weather check" is obtained as a result of semantic analysis (NLU) of the speech saying "and tell me the weather", the Intent="weather check" is not related to the e-mail processing function, but is a function that can be executed as a function of the system, and the context information indicating that the user 2 is going out from now is recorded. The response presence/absence determination unit 123 therefore causes weather check and a response R43 thereof to be instantly performed.

Here, as illustrated in FIG. 9, because the response R43 of the weather check function corresponding to the speech saying "and tell me the weather" is performed during the response R42 of the e-mail processing function corresponding to the speech saying "send the mail to the smartphone", the response R42 saying "send the mail to the smartphone" is stopped, and the response R43 saying "today's weather is cloudy during the daytime, and it temporarily rains from the evening" is instantly performed. With this configuration, in the speech dialogue system 1, both tasks of the e-mail processing function and the weather check function are executed.

Moreover, in the speech dialogue system 1, when executing the weather check function, it is possible to access a server releasing information regarding weather forecast via the internet 30, for example, acquire information regarding weather forecast that corresponds to position information of the user 2 (e.g. current position, a position of an outing destination, etc.), and make a response corresponding to the weather forecast.

Fourth Example of Response Presence/Absence Determination

Figure 10:
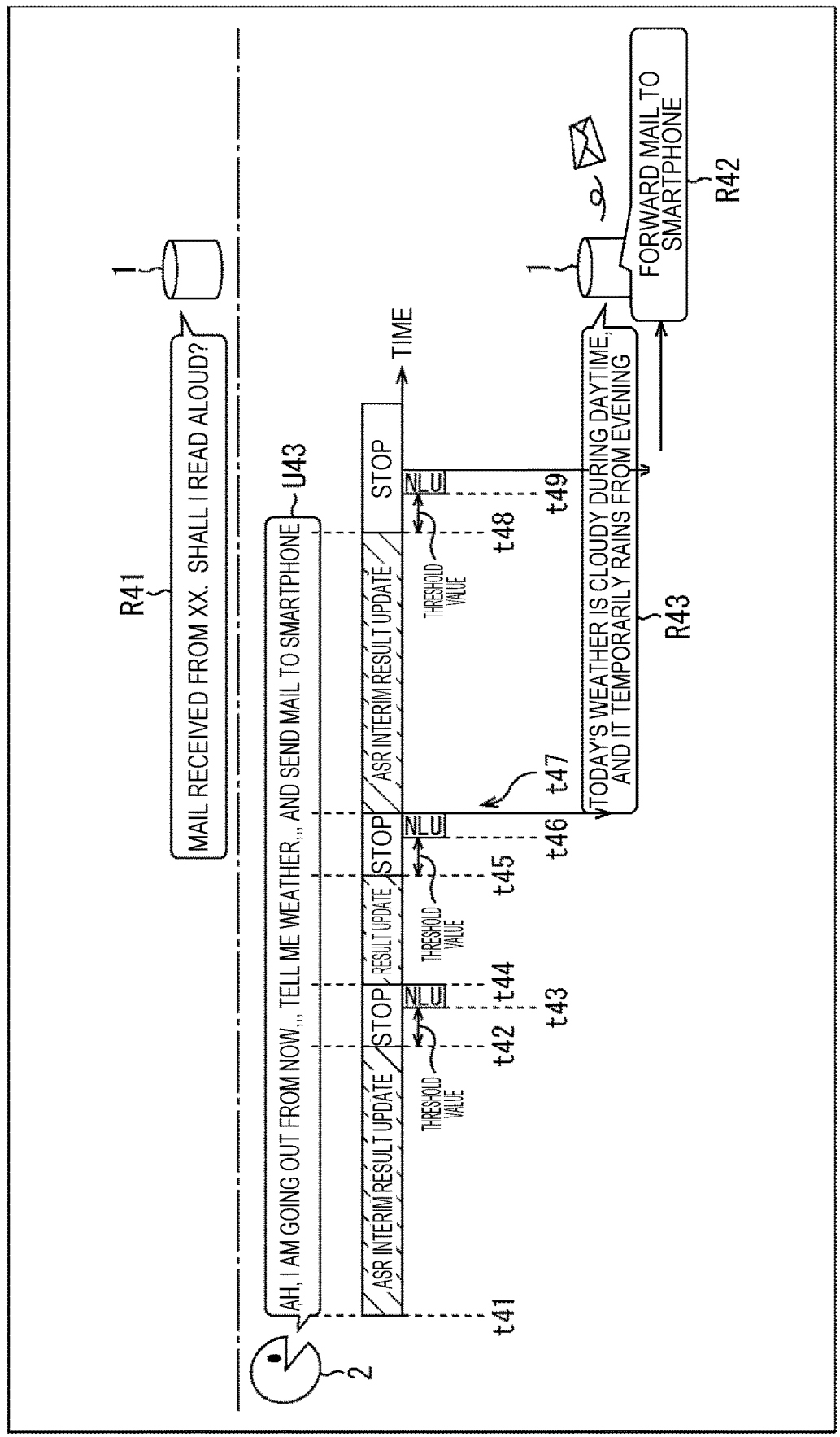
FIG. 10 is a diagram illustrating a fourth example of response presence/absence determination.

FIG. 10 is a diagram illustrating a fourth example of response presence/absence determination.

In FIG. 10, similarly to FIGS. 8 and 9 described above, the speech dialogue system 1 performs a question R41 "A mail received from xx, Shall I read aloud?".

To the question R41, the user 2 makes an answer U43 saying "Ah, I am going out from now , , , tell me the weather , , , and send the mail to the smartphone". At this time, when the update of an ASR interim result has not been updated for a time exceeding a threshold value (e.g. 300 ms), during a period from when a speech saying "Ah, I am going out from now," ends to when a speech saying "tell me the weather" is started, the speech dialogue system 1 determines that it is an input timing of an ASR interim result.

Thus, in FIG. 10, similarly to FIGS. 8 and 9 described above, at the time t43, an input timing of an ASR interim result is determined, and an ASR interim result saying "Ah, I am going out from now," is input to semantic analysis processing, but because a result of the semantic analysis (NLU) is not an intention (Intent) related to the e-mail processing function, it is determined that a response is not to be made.

In addition, in FIG. 10, in the speech dialogue system 1, when the update of art ASR interim result has not been updated for a time exceeding a threshold value (e.g. 300 ms), during a period from when the speech saying "tell me the weather" ends to when a speech saying "and send the mail to the smartphone" is started, an input timing of an ASR interim result is determined.

Thus, in FIG. 10, at the time t46, an input timing of an ASR interim result is determined, an ASR interim result saying "tell me the weather" is input to semantic analysis processing, and as a result of semantic analysis (NLU), Intent="weather check" is obtained.

Here, in the fourth example, similarly to the above-described third example, when the ASR interim result of the speech saying "Ah, I am going out from now," is input to semantic analysis processing, as a result of semantic analysis (NLU), Intent="going out" and Entity="now" are obtained. Then, from the result of the semantic analysis (NLU), the user 2 is expected to go out from now, and the information can be recorded as context information.

Then, after that, when Intent="weather check" is obtained as a result of semantic analysis (NLU) of the speech saying "tell me the weather", the Intent="weather check" is not related to the e-mail processing function that follows the situation of the dialogue, but is a function that can be executed as a function of the system, and the context information indicating that the user 2 is going out from now is recorded. The response presence/absence determination unit 123 can therefore cause weather check and the response R43 thereof to be instantly performed.

Furthermore, in FIG. 10, in times t47 to t48, speech recognition processing is performed using the speech saying "and send the mail to the smartphone", and the update of the ASR interim result is restarted. Then, after the time t48, the update of the ASR interim result is stopped, an input timing of an ASR interim result is determined, and an ASR interim result saying "and send the mail to the smartphone" is input to semantic analysis processing. As a result of the semantic analysis (NLU), Intent="mail forwarding" and Entity="smartphone" are obtained, and because the intention is the e-mail processing function that follows the situation of the dialogue, forwarding of the e-mail and the response R42 thereof are performed.

Nevertheless, at this time, in the speech dialogue system 1, because the response R43 of the weather check function is being performed, instead of being instantly performed, the response 42 of the e-mail processing function is performed after the response R43 of the weather check function is completed. More specifically, in the fourth example, when an earlier response (preceding response) is stopped and a subsequent response (a response to the subsequently-acquired intention (Intent)) is performed as in the above-described third example, the response ends halfway before the content of weather forecast is fully conveyed. Thus, the response R42 being a subsequent response is started after the response R43 being an earlier response is completed.

Moreover, as for e-mail forwarding processing to be performed by the e-mail processing function, the processing may be started after the response R43 to the user 2 is completed, or the processing may be started before the response R43 ends.

Another Example of Response Presence/Absence Determination

Moreover, in the above-described example of response presence/absence determination, the description has been given using the schedule function (e.g. registration of schedule), the e-mail processing function (e.g. forwarding of e-mail), and the weather check function as examples of requests that can be accepted as functions of the speech dialogue system 1, but the functions of the speech dialogue system 1 are not limited to these functions, and another function may be included.

For example, it is possible to determine the presence or absence of a system response depending on whether an intention can be executed as a function of the speech dialogue system 1, in accordance with various situations of dialogues such as a request for an operation (e.g. "start", "stop", "return", "forward", etc.) in replaying music or a moving image, or a question about an arrival time in navigation.

In addition, in the speech dialogue system 1, in a case in which a speech of the user 2 does not follow a situation of a dialogue, speech recognition processing is successively continued without returning a system response, and the speech recognition processing is completed on the basis of the fact that a voice input is not performed for a fixed time (e.g. about 1 to 2 seconds), for example, a response such as "I could not understand what you said" or "please rephrase", for example, may be made.

Furthermore, the speech dialogue system 1 may not only instantly perform a response speech when an intention can be executed as a function of the system, but also vary a time of a system response (response speech) depending on the state of the user 2, such as an age group or a way of speaking of the user, for example. More specifically, for example, in a case in which the user 2 is an elderly person or a person who speaks slowly, instead of instantly performing a response speech, it is possible to perform a response speech slowly while making a small interval.

Adaptive Processing that Uses Learning Result

Meanwhile, in the speech dialogue system 1, by preliminarily performing learning processing corresponding to an individual attribute of the user on the server 20 side, adaptive processing that uses a result of the learning can be performed.

For example, in the case of determining the completion of a speech of the user 2 on the basis of the fact that a voice input is not performed for a fixed time, as in the conventional method (e.g. example in FIG. 1), types of NLU input determination factors and intentions (Intents) to be obtained as a result of semantic analysis (NLU) that cause the completion of the speech can be statistically collected and learned.

Here, the NLU input determination factor indicates the type of a determination factor (condition) that causes an ASR interim result to be input to semantic analysis processing, when a speech of the user 2 is completed. Examples of the NLU input determination factors include, for example, a reliability score associated with an ASR interim result, a result of natural language recognition, a specific wording, intonation, the orientation of a face or a visual line of the user 2, which have been described above, and the like.

In addition, when the adaptive processing that uses a learning result to be obtained in this manner is to be performed, the adaptive processing may be performed on the basis of a demographic attribute of the user 2. More specifically, users can be classified by information (demographic attribute) such as age group, gender, or area, for example, and processing adapted to a learning result can be performed.

With this configuration, a difference in word end expression, intonation, or the like of a speech that is attributed to age group, gender, area (dialect), or the like, for example, can be adapted to an individual attribute of the user. Moreover, in a case in which the terminal device 10 is a network device such as a game machine, for example, as a demographic attribute, attribute information can be acquired from login information of the user.

Figure 11:
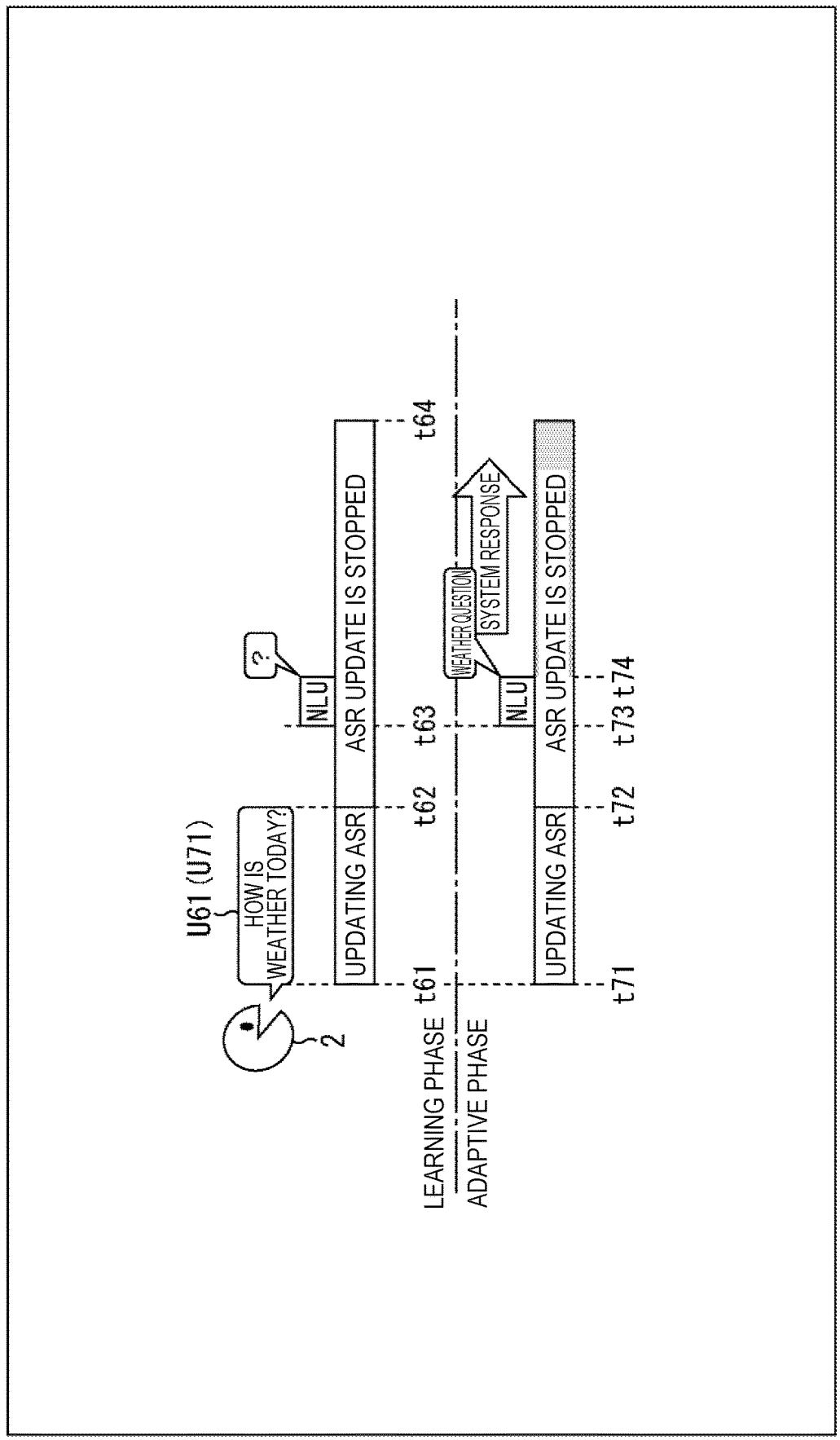
FIG. 11 is a diagram illustrating an example of adaptive processing that uses a learning result.

FIG. 11 illustrates an example of adaptive processing that uses a learning result.

In FIG. 11, an upper part provided above a dashed-dotted line extending in a transverse direction in the drawing indicates a learning phase, and a lower part provided below the dashed-dotted line indicates an adaptive phase.

For example, in the learning phase, a speech U61 saying "How is the weather today?" is assumed to be performed by the user 2. In this case, in the speech dialogue system 1, in times t61 to t62, speech recognition processing is performed using the speech U61 saying "How is the weather today?", and an ASR interim result is updated, but after the time t62, the update of the ASR interim result is stopped.

Then, when an input timing comes at the time t63, an ASR interim result of the speech U61 is input to semantic analysis processing and a result of semantic analysis (NLU) is obtained. At this time, in a case in which a reliability score of an intention (Intent) obtained as a result of semantic analysis (NLU) is low, the update of the ASR interim result is stopped even after the result of semantic analysis (NLU) is obtained, but the user 2 is kept waiting until it is determined that the speech of the user 2 is completed.

In other words, a system response is not made until a result of speech recognition (ASR) is defined at the time t64 on the basis of the fact that a voice input is not performed for a fixed time, and it is determined that the speech of the user 2 has been completed.

In this case, the semantic analysis/response determination processing unit 108 learns that the reliability score of the intention (Intent) to be obtained as a result of semantic analysis (NLU) performed on the speech U61 saying "How is the weather today?" is low, but the speech has been completed by the speech U61 (i.e. NLU input determination factor to semantic analysis processing when the speech of the user 2 is completed), and records a learning result into a database.

On the other hand, in the adaptive phase to be performed thereafter, in a case in which a speech U71 saying "How is the weather today?" is performed again by the user 2, in the speech dialogue system 1, in times t71 to t72, speech recognition processing is performed using the speech U71 saying "How is the weather today?", and an ASR interim result is updated.

After that, the update of the ASR interim result is stopped, and when an input timing comes at a time t73, an ASR interim result of the speech U71 is input to semantic analysis processing, and a result of semantic analysis (NLU) is obtained.

At this time, in the semantic analysis/response determination processing unit 108, when an ASR interim result of the speech U61 (speech U71) saying "How is the weather today?" is input to semantic analysis processing as a NLU input determination factor to semantic analysis processing that has been learned in the above-described learning phase, because it is learned that the reliability score of the intention (intent) is low but the speech is completed, by adapting the learning result, it is determined that the speech is completed after the speech U71.

Then, in the semantic analysis/response determination processing unit 108, after a result of semantic analysis (NLU) performed on the speech U71 saying "How is the weather today?" is obtained, the weather check function corresponding to an intention (Intent) being "weather question" is immediately executed, and a system response thereof (e.g. "today's weather is sunny") is made.

In this manner, by performing adaptive processing that uses a learning result of a use situation of the user 2 (response presence/absence determination processing), at the time t74 following the end of the semantic analysis processing, it is determined that the speech of the user 2 has been completed, and it becomes possible to make a system response. Thus, as compared with a case in which a learning result is not used, it is possible to speed up a responsivity of a system response to the speech of the user 2.

In other words, it can be said that, in the semantic analysis/response determination processing unit 108, in the learning phase, for example, a NLU input determination factor to semantic analysis processing that is used when the speech of the user 2 is completed, or an intention (Intent) to be obtained by sequentially performing semantic analysis processing is statistically learned along a time axis, and in the adaptive phase, processing adapted to the learning result (e.g. statistical information regarding speech completion past record) (response presence/absence determination processing) is performed in subsequent processing. Moreover, as described above, in the semantic analysis/response determination processing unit 108, when adaptive processing that uses a learning result is to be performed, the adaptive processing may be performed on the basis of a demographic attribute of the user 2.

Example of Use of Multimodal Interface

Meanwhile, in the speech dialogue system 1, in a case in which the terminal device 10 provided on the local side can use a plurality of communication modes such as visual sense or acoustic sense, using the multimodal interface, information presentable by a method other than a response speech may be presented earlier even during the speech of the user 2. For example, by displaying earlier-presentable information on a screen prior to a response speech, a system response can be promptly presented to the speaking user 2.

Moreover, here, for the sake of explanatory convenience, a speech to be performed by the user 2 from a speech start until when an ASR interim result is input to semantic analysis processing in the middle of the speech will be described as a "speech A", and a speech continuing from the input and starting from the continuation start to the completion will be described as a "speech B".

Here, first of all, as a first example of multimodal use, in a case in which a function that can be executed as a function of the system is specified by a result of semantic analysis (NLU) of the speech A, even during the speech of the speech B, the function corresponding to the result of semantic analysis (NLU) of the speech A can be executed, and a result of the execution can be displayed on a screen of the image output unit 113 formed as a display. Then, subsequent to the speech A, at a time point at which the speech B is completed, a system response is output as a voice from the voice output unit 112 formed as a speaker.

For example, in a case in which a speech saying "turn up sound volume and tell me tomorrow's weather" is performed by the user 2, because "turn up sound volume" corresponds to the speech A and "tell me tomorrow's weather" corresponds to the speech B, for example, the following processing can be performed. More specifically, during the speech of the speech B, the speech dialogue system 1 can turn up sound volume, display information regarding a sound volume indicator on the screen of the image output unit 113, and after that, at the completion of the speech B, information regarding the tomorrow's weather can be output as a voice from the voice output unit 112.

In addition, for example, in a case in which a speech saying "search for <music title> of <artist name>" is performed by the user 2, because "of <artist name>" corresponds to the speech A and "search for <music title>" corresponds to the speech B, for example, the following processing can be performed. More specifically, on the basis of the speech up to "of <artist name>" being the speech A, the speech dialogue system 1 displays a list of representative music titles of the artist searched for, on the screen of the image output unit 113, and after that, on the basis of the speech saying "search for <music title>" being the speech B, starts the replay of a target piece and outputs the music from the voice output unit 112.

Moreover, for example, in a case in which an English speech saying "I want to listen . . . " is performed by the user 2, at a time point at which "I want to listen" being the speech A is spoken, the speech dialogue system 1 activates a music replay player and displays the music replay player on the screen of the image output unit 113, and after that, for example, when a music tile is spoken as the speech B, starts the replay of the music piece and outputs the music from the voice output unit 112.

In addition, for example, in a case in which a speech regarding an address that says "Tokyo, Minato-ku, Konan . . . " is performed by the user 2, at a time point at which a speech saying "Tokyo" is performed, the speech dialogue system 1 activates a map application and displays a map of Tokyo, and after that, at a time point at which a speech saying "Minato-ku" is performed, enlarges the map of Tokyo and displays a map of Minato-ku. Then, at a time point at which a speech saying "Konan" is further performed, the speech dialogue system 1 enlarges the map of Minato-ku and displays a map of a Konan area. In other words, on the screen of the image output unit 113, each time the user 2 pronounces a place name, a region of the map is displayed in an enlarged manner in accordance with the place name.

Moreover, for example, when a plurality of users checks their respective schedules, each time a name of a target user is pronounced from among the plurality of users (e.g. "A, B, C, and so on", etc.), the speech dialogue system 1 may sequentially display the schedule of the target user on the screen. In addition, when searching is to be performed by voice using a plurality of keywords, each time the user 2 pronounces a keyword, the speech dialogue system 1 may sequentially display a search result narrowed down by a target keyword, on the screen (it can be said that a so-called incremental search function is implemented).

Next, as a second example of multimodal use, in a case in which a result of semantic analysis (NLU) of the speech A does not follow a situation of a dialogue, and the speech dialogue system 1 cannot execute a function corresponding to the result of semantic analysis (NLU), during the speech of the speech B, it is possible to display, on the screen of the image output unit 113, information indicating that the system is continuously hearing the speech.

Here, for example, by displaying, on the screen, information such as a symbol "?", an image of an ear representing that the speech is being heard, or a nodding anthropomorphic agent, the user 2 can be informed that the speech dialogue system 1 is continuously hearing the speech.

Next, as a third example of multimodal use, in a case in which a reliability score of a result (Intent) of semantic analysis (NLU) of the speech A is low, and the result is uncertain, the speech dialogue system 1 can present information regarding the intention (Intent), using an expression weaker than usual.

Here, for example, it is possible to faintly display an image on the screen of the image output unit 113 by reducing a difference in contrasting of the image to be displayed (by changing contrast), or turn down sound volume of a voice to be output from the voice output unit 112, and output the voice with a small sound volume.

Moreover, after that, at the stage where a reliability score of a result (Intent) of semantic analysis (NLU) of the speech B becomes higher and the result becomes certain, the speech dialogue system 1 can present information regarding the intention (Intent), using an expression stronger than the weak expression used earlier (e.g. normal expression or expression stronger than normal). Here, for example, it is possible to sharply display an image on the screen by increasing a difference in contrasting of the image to be displayed, or turn up sound volume and output a voice with a large sound volume.

Specifically, for example, in a case in which an English speech saying "How is the weather in Osaka" is performed by the user 2, because "How is the weather" corresponds to the speech A and "in Osaka" corresponds to the speech B, for example, the following processing can be performed. More specifically, at a time point at which the speech A is performed, the speech dialogue system 1 faintly displays "weather in Tokyo" being the current position, and after that, at a time point at which the speech B is performed, sharply displays "weather in Osaka" being a target area.

Lastly, as a fourth example of multimodal use, in a case in which a target device (e.g. the terminal device 10) is an anthropomorphic agent and has a face, at the stage of the speech A, when a reliability score of a result (Intent) of semantic analysis (NLU) is high and the result is certain, the anthropomorphic agent may look toward the user 2. As a result, by the visual line, the user 2 receives a feedback promoting the speech B, and it becomes easier for the user 2 to speak the speech B following the speech A.

For example, in a case in which a speech saying "I want to listen to a music piece called xxx, turn up sound volume and let me listen to the music piece" is performed by the user 2, because "I want to listen to a music piece called xxx," corresponds to the speech A and "turn up sound volume and let me listen to the music piece" corresponds to the speech B, for example, the following processing can be performed. More specifically, because the result becomes certain at the stage of speech A, the speech dialogue system 1 causes the anthropomorphic agent to look toward the user 2.

With this configuration, the user 2 notices from the visual line of the anthropomorphic agent that the desired music piece has been found, and requests sound volume up. Then, on the basis of a result of semantic analysis (NLU) of the speech B, the speech dialogue system 1 turns up sound volume and starts the replay of the target music piece. Moreover, the anthropomorphic agent described here may be obtained by anthropomorphizing the terminal device 10 itself as a communication robot, for example, or may be displayed on the screen of the image output unit 113 as a character or the like, for example.

Moreover, in the above description, as a presentation method of an execution result of a function corresponding to a result of semantic analysis (NLU) of the speech A that is to be presented during the speech B after the speech A is completed, the display on the screen of the image output unit 113 formed as a display has been described, but a presentation method other than a voice output, such as a method of vibrating a device worn by the user 2, for example, may be employed.

In addition, when multimodal is used, for example, in accordance with the control from (the response presence/absence determination unit 123 of) the semantic analysis/response determination processing unit 108, the response generation unit 109 may display, during the speech of the speech B, an execution result of a function corresponding to a result of semantic analysis (NLU) of the speech A, on the screen of the image output unit 113 via the output image processing unit 111.

After that, at a time point at which the speech of the speech B is completed, in accordance with the control from (the response presence/absence determination unit 123 of) the semantic analysis/response determination processing unit 108, the response generation unit 109 outputs an execution result of a function corresponding to a result of semantic analysis (NLU) of the speech B (system response), from the voice output unit 112 via the speech synthesis processing unit 110. With this configuration, in the speech dialogue system 1, a multimodal interface becomes available.

Flow of Response Presence/Absence Determination Processing

Next, a flow of response presence/absence determination processing to be executed by the speech dialogue system 1 will be described with reference to a flowchart in FIG. 12.

Figure 5:
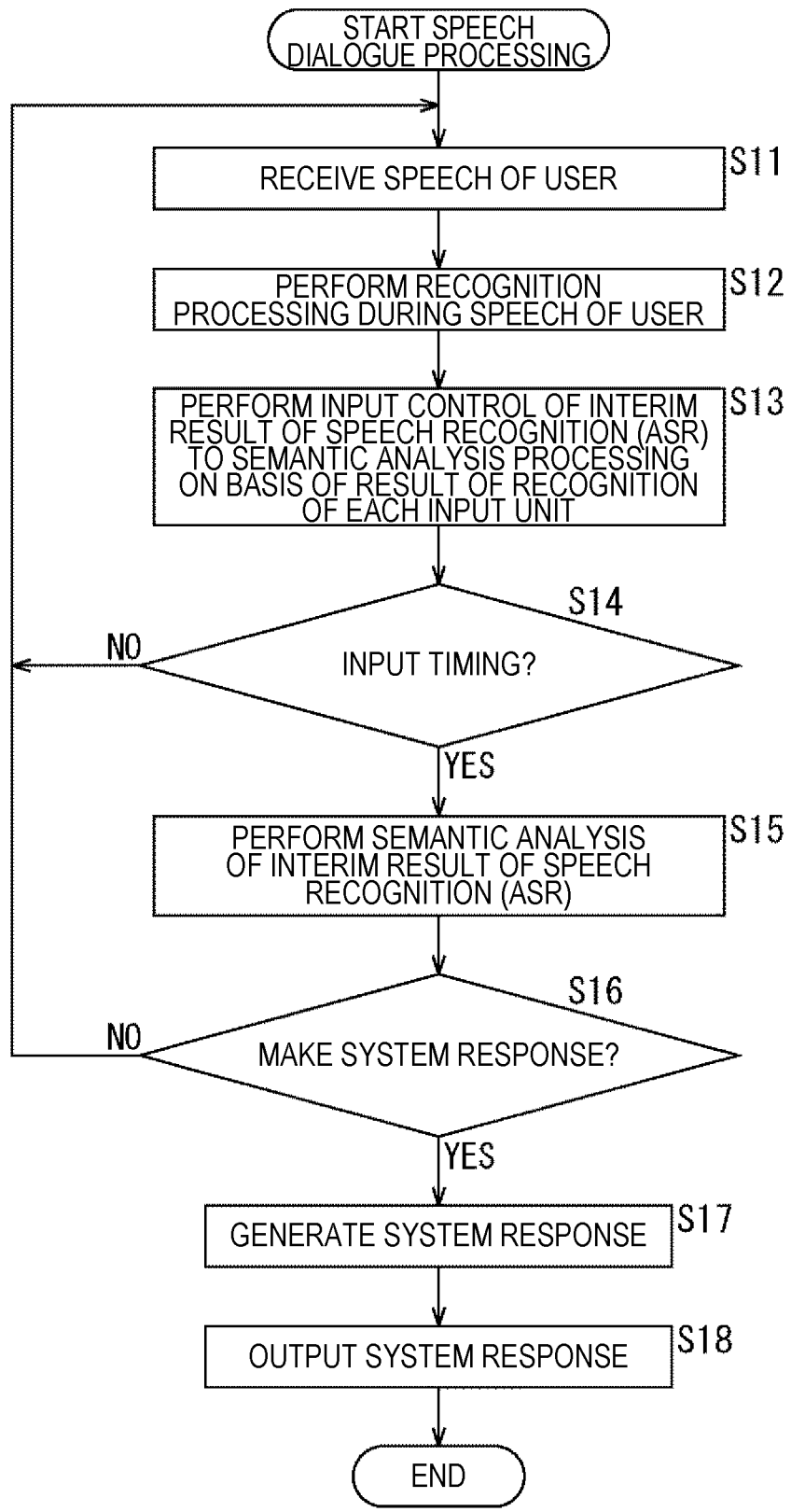
FIG. 5 is a flowchart describing a flow of a speech dialogue processing.

Moreover, the response presence/absence determination processing is included in the process in step S16 in the speech dialogue processing in FIG. 5.

In step S31, the response presence/absence determination unit 123 determines whether or not a result (Intent) of semantic analysis (NLU) that is obtained in the above-described process in step S15 (FIG. 5) indicates context information of the user 2.

In a case in which it is determined in step S31 that the intention (Intent) indicates context information of the user 2, the processing is advanced to step S32. In step S32, the response presence/absence determination unit 123 records the context information of the user 2 that is included in the intention (Intent) obtained as a result of semantic analysis (NLU).

Moreover, by recording the context information, when results of subsequent semantic analysis (NLU) are acquired in the speech of the same user, the context information can be used for determining the presence or absence of a system response.

When the process in step S32 ends, the processing is advanced to step S33. In addition, in a case in which it is determined in step S31 that the intention (Intent) does not indicate context information of the user 2, the process in step S32 is skipped, and the processing is advanced to step S33.

In step S33, the response presence/absence determination unit 123 determines whether or not the intention (Intent) can be executed as a function of the system.

In a case in which it is determined in step S33 that the intention (Intent) can be executed as a function of the system, the processing is advanced to step S34. In step S34, the response presence/absence determination unit 123 determines whether or not the intention (Intent) follows a situation of a dialogue.

In a case in which it is determined in step S34 that the intention (Intent) follows a situation of a dialogue, the processing is advanced to step S35.

In addition, in a case in which it is determined in step S34 that the intention (Intent) does not follow a situation of a dialogue, the processing is advanced to step S36. In step S36, the response presence/absence determination unit 123 determines whether or not the intention (Intent) conforms to the context information of the user In a case in which it is determined in step S36 that the intention (Intent) conforms to the context information of the user 2, the processing is advanced to step S37. In step S37, the response presence/absence determination unit 123 registers a system response to the intention (Intent) acquired this time, as a system response that is based on the context information of the user 2. When the process in step S37 ends, the processing is advanced to step S35.

In step S35, the response presence/absence determination unit 123 determines whether or not the system is making a response to a preceding user speech.

In a case in which it is determined in step S35 that the system is making a response to a preceding user speech, the processing is advanced to step S38. In step S38, the response presence/absence determination unit 123 determines whether or not the preceding response is made on the basis of the context information of the user 2.

In a case in which it is determined in step S38 that the preceding response is made on the basis of the context information of the user 2, the processing is advanced to step S39. In step S39, the response presence/absence determination unit 123 determines that a response to the intention (Intent) acquired this time is to be executed after the preceding response is completed, and supplies a result of the response presence/absence determination to the response generation unit 109.

On the other hand, in a case in which it is determined in step S38 that the preceding response is not made on the basis of the context information of the user 2, the processing is advanced to step S40. In step S40, the response presence/absence determination unit 123 determines that the preceding response is to be stopped and a response corresponding to the intention (Intent) acquired this time is to be instantly executed, and supplies a result of the response presence/absence determination to the response generation unit 109.

In addition, in a case in which it is determined in step S35 described above that the system is not making a response to the preceding user speech, the processing is advanced to step S41. In step S41, the response presence/absence determination unit 123 determines that a response corresponding to the intention (Intent) acquired this time is to be instantly executed, and supplies a result of the response presence/absence determination to the response generation unit 109.

Furthermore, in a case in which it is determined in step S33 described above that the intention (Intent) cannot be executed as a function of the system, or in a case in which it is determined in step S36 described above that the intention (Intent) does not conform to the context information of the user 2, the processing is advanced to step S42. In step S42, the response presence/absence determination unit 123 determines that a response to the intention (Intent) acquired this time is not to be made, and supplies a result of the response presence/absence determination to the response generation unit 109 (here, notification itself of the result of response presence/absence determination needs not be performed).

Figure 12:
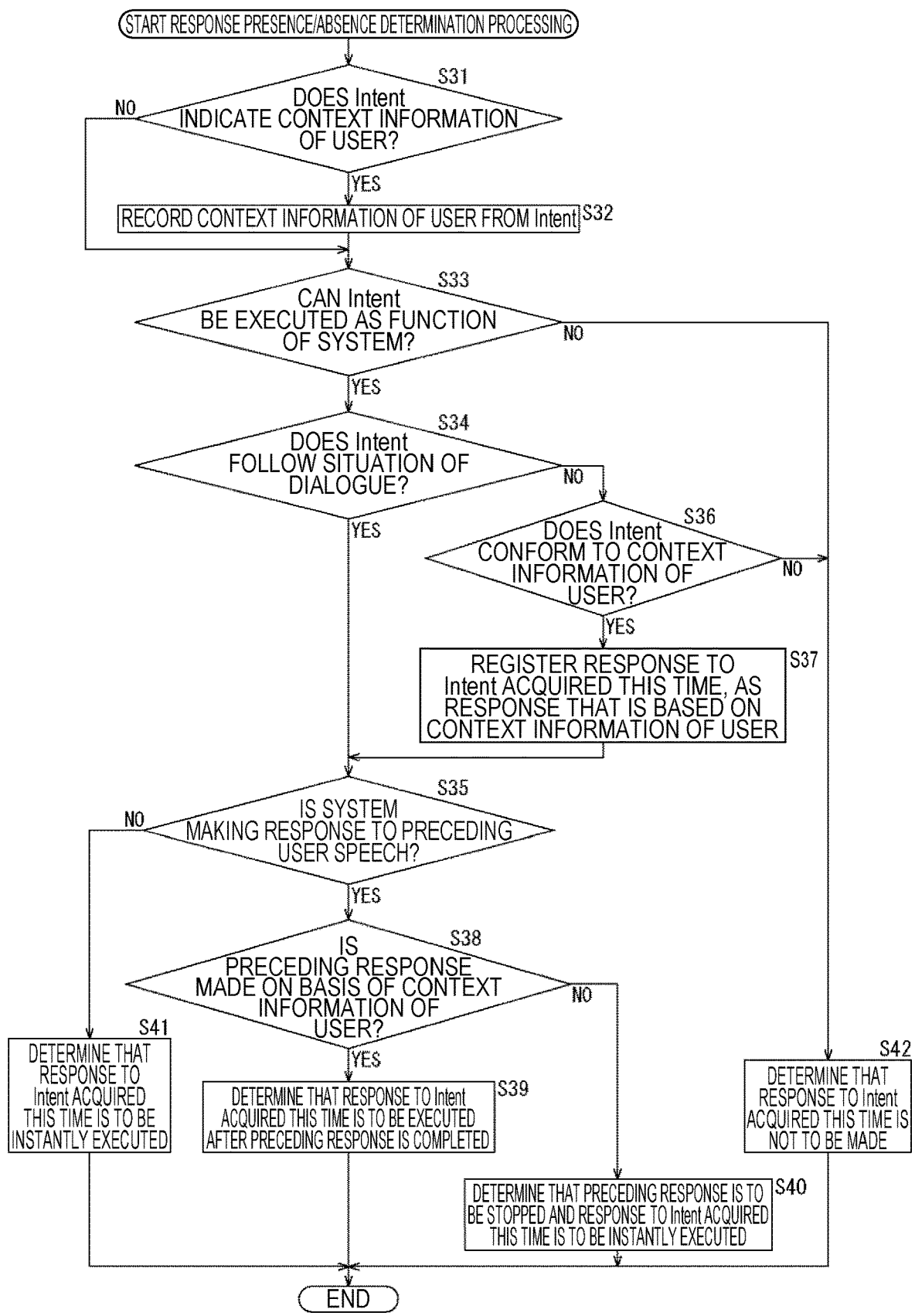
FIG. 12 is a flowchart describing a flow of response presence/absence determination processing.

Moreover, when any of the processes in steps S39, S40, S41, and S42 ends, the response presence/absence determination processing illustrated in FIG. 12 is ended.

Hereinbefore, a flow of the response presence/absence determination processing has been described.

Moreover, in the response presence/absence determination processing illustrated in FIG. 12, the context information of the user 2 is recorded on the basis of a result of semantic analysis (NLU) that is to be obtained in accordance with the speech of the user 2, but context information of the user 2 may be obtained from another type of information other than an intention (Intent). Here, as another type of information other than the result of semantic analysis (NLU), for example, context information of the user 2 can be acquired on the basis of a result of image recognition (image information) that is to be obtained by performing image recognition processing on image data.

For example, as an example of acquiring context information on the basis of a result (Intent, Entity) of the above-described semantic analysis (NLU), it is assumed that context information (e.g. "going out from now") corresponding to intent="going out" and Entity="now" is recorded in a case in which the user 2 performs a speech saying "Ah, I am going out from now,".

On the other hand, for example, as an example of acquiring context information on the basis of a result of image recognition, in a case in which it is recognized as a result of the image recognition that the user 2 is going out of a room, context information indicating "going out" can be recorded. In this case, for example, when the user 2 performs a speech saying "tell me the weather", on the basis of the context information, the speech dialogue system 1 can determine to make a system response.

In addition, for example, in a case in which it is recognized as a result of the image recognition that the user 2 is doing cooking in a kitchen, context information indicating "cooking in a kitchen" can be recorded. In this case, for example, when a speech saying "tell me recipe of xxx" is performed, on the basis of the context information, the speech dialogue system 1 can determine to make a system response.

As described above, in the speech dialogue system 1, by sequentially inputting an ASR interim result to semantic analysis processing on the basis of a result of recognition that is to be obtained during the speech of the user 2, and determining the presence or absence of a system response on the basis of a result of semantic analysis (NLU) that is to be accordingly obtained, it is possible to speed up a responsivity of a system response to the speech of the user 2.

More specifically, in the speech dialogue system 1, instead of determining the completion of the speech of the user 2 on the basis of the fact that a voice input is not performed for a fixed time (predefined time), as in the conventional speech dialogue system 90 illustrated in FIGS. 1 and 2, the completion is determined depending on the situation of intention understanding of the user 2 on the system side. Thus, a response of a system response can be returned within a time nearly equal to a time taken by a person for performing a responsive action to a speech of another person. In addition, by speeding up a responsivity of a system response, in a dialogue with the speech dialogue system 1 of the present technology, the user 2 can sense a difference from the conventional speech dialogue system 90 even if the time is shortened only by about 0.5 seconds, for example.

Then, by a responsivity of the speech dialogue system 1 reaching a nearly equal level to a responsive action of a human, the user 2 feels that a natural speech can be performed to the system with being unconscious of a turn of a dialogue.

In addition, in the speech dialogue system 1, for example, in a case in which a standby time of user speech completion is set to a short time, even if the user 2 makes a pause in the speech to the system, a system response is returned at a timing intended by the user 2 itself. Thus, even if the user 2 does not perform a speech to the system in the same breath, because a system response is returned at the intended timing, it becomes possible to perform a speech to the system by a natural speech not being a voice command.

3. Modified Example

As an example, the above description has been given of a configuration of the speech dialogue system 1 in which structural elements from the voice input unit 101 to the sensor unit 103, the voice output unit 112, and the image output unit 113 are incorporated into the terminal device 10 on a local side, and structural elements from the speech recognition unit 104 to the output image processing unit 111 are incorporated into the server 20 on a cloud side, but each of the structural elements from the voice input unit 101 to the image output unit 113 may be incorporated into whichever device of the terminal device 10 and the server 20.

For example, all the structural elements from the voice input unit 101 to the image output unit 113 may be incorporated into the terminal device 10 side, and processing may be completed on the local side. Nevertheless, even in a case in which such a configuration is employed, various types of databases may be managed by the server 20 on the internet 30.

In addition, in the speech recognition processing to be performed by the speech recognition unit 104, and the semantic analysis processing to be performed by the semantic analysis unit 122, a speech recognition service and a semantic analysis service that are provided in another service may be used. In this case, for example, in the server 20, by sending voice data to the speech recognition service provided on the internet 30, a result of speech recognition (ASR) can be obtained. In addition, for example, in the server 20, by sending the ASR interim result (test data) to the semantic analysis service provided on the internet 30, a semantic analysis (NLU) result (Intent, Entity) of the ASR interim result can be obtained.

4. Configuration of Computer

Figure 13:
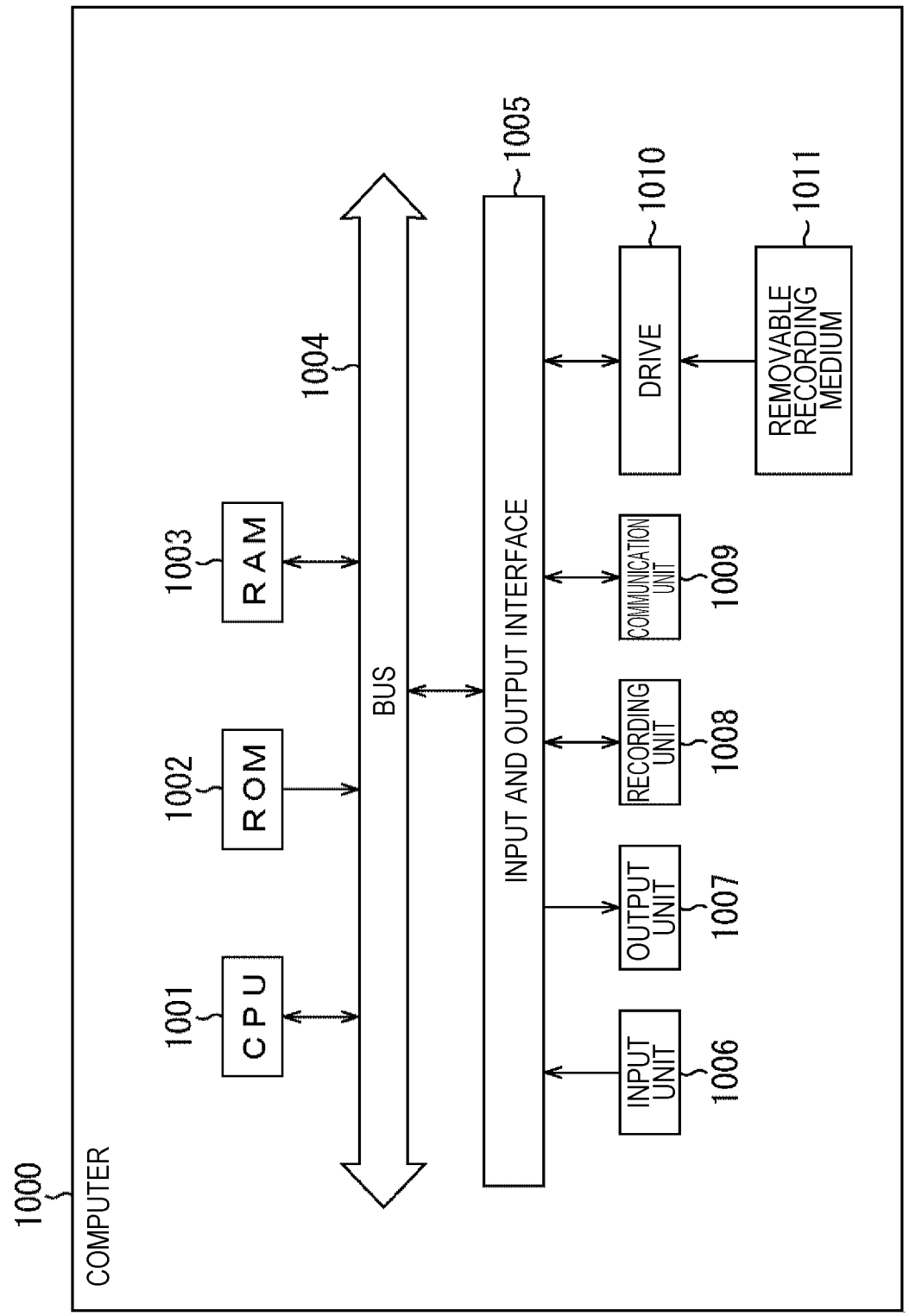
FIG. 13 is a diagram illustrating a configuration example of a computer.

The above-described series of processes (e.g. the speech dialogue processing illustrated in FIG. 5, etc.) may be executed by hardware or software. In a case in which the series of processes is executed by software, a program including the software is installed on each computer. FIG. 13 is a block diagram illustrating an example of a hardware configuration of a computer in which the above-described series of processes is executed by the program.

In a computer 1000, a central processing unit (CPU) 1001, a read-only memory (ROM) 1002, and a random access memory (RAM) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

A microphone, a keyboard, a mouse, or the like is used as the input unit 1006. A speaker, a display, or the like is used as the output unit 1007. A hard disk, a nonvolatile memory, or the like is used as the recording unit 1008. A network interface or the like is used as the communication unit 1009. The drive 1010 drives the removable recording medium 1011 such as a magnetic disk, an optical disc, a magneto-optical disc, or a semiconductor memory.

In the computer 1000 that has the above-described configuration, the CPU 1001 executes the above-described series of processes by loading a program recorded on the ROM 1002 or the recording unit 1008 to the RAM 1003 via the input and output interface 1005 and the bus 1004 and executing the program.

The program executed by the computer 1000 (the CPU 1001) can be recorded on, for example, the removable recording medium 1011 such as a package medium for supply. In addition, the program can be supplied via a wired or wireless transmission medium such as a local area network, the Internet, or digital broadcasting.

In the computer 1000, the program can be installed on the recording unit 1008 via the input and output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Moreover, embodiments of the present technology are not limited to the above-described embodiments, but various changes can be made within the scope of the present technology without departing from the gist of the present technology.

In addition, each step of the speech dialogue processing illustrated in FIG. 5 can be executed by a plurality of devices in a shared manner, in addition to being executed by one device. Furthermore, in a case in which one step includes a plurality of processes, the plurality of processes included in the one step can be executed by a plurality of devices in a shared manner, in addition to being executed by one device.

Additionally, the present technology may also be configured as below.

(1)
An information processing device including:
a processing unit configured to determine, on the basis of a result of semantic analysis that is to be obtained from an interim result of speech recognition of a speech of a user, presence or absence of a response to the speech of the user.

(2)
The information processing device according to (1), in which the processing unit includes
a semantic analysis control unit configured to sequentially input, to semantic analysis processing, an interim result of the speech recognition on the basis of a result of recognition that is to be obtained during the speech of the user, and
a response presence/absence determination unit configured to determine presence or absence of the response on the basis of a result of the semantic analysis that is to be obtained by sequentially performing the semantic analysis processing.

(3)
The information processing device according to (2), in which the semantic analysis control unit includes at least one result of recognition among a result of recognition of voice data of the speech of the user, a result of recognition of image data obtained by capturing an image of the user, a result of recognition of sensor data obtained by sensing the user or a surrounding of the user, or a result of natural language recognition that is obtained by performing natural language processing of an interim result of the speech recognition.

(4)
The information processing device according to (2) or (3), in which the semantic analysis control unit determines a timing at which the interim result of the speech recognition is to be input to the semantic analysis processing, on the basis of a situation of the speech of the user that is to be obtained from a result of the recognition.

(5)
The information processing device according to any of (2) to (4), in which the response presence/absence determination unit determines to make the response at a time point at which a result of semantic analysis by which a system can execute a function that follows a dialogue with the user is obtained as a result of the semantic analysis that is to be obtained by sequentially performing the semantic analysis processing.

(6)
The information processing device according to any of (2) to (5), in which the response presence/absence determination unit determines to make the response when an intention that can be executed as a function of the system is obtained on the basis of a result of the semantic analysis that is to be obtained by sequentially performing the semantic analysis processing.

(7)
The information processing device according to (6), in which the response presence/absence determination unit
records context information of the user on the basis of a result of first semantic analysis that is obtained at a certain time point, and
in a case in which a result of second semantic analysis that is subsequently obtained conforms to content of the recorded context information, determines to make a response that is based on the result of the second semantic analysis.

(8)
The information processing device according to (7), in which, in a case in which a first response is being made prior to a second response serving as a target of determination, when the first response is based on the context information, the response presence/absence determination unit determines to make the second response after the first response is completed.

(9)
The information processing device according to (7) or (8), in which, in a case in which a first response is being made prior to a second response serving as a target of determination, when the first response is not based on the context information, the response presence/absence determination unit determines to stop the first response and instantly make the second response.

(10)
The information processing device according to any of (2) to (9), in which the response presence/absence determination unit determines presence or absence of the response on the basis of intention (Intent) and entity information (Entity) that are to be obtained by sequentially performing the semantic analysis processing.

(11)
The information processing device according to any of (2) to (10), in which the processing unit determines presence or absence of the response on the basis of a learning result corresponding to a use situation of each of the users.

(12)
The information processing device according to (11), in which the processing unit
statistically learns, along a time axis, an input determination factor to the semantic analysis processing that is used when the speech of the user is completed, or an intention (Intent) to be obtained by sequentially performing the semantic analysis processing, and
performs processing adapted to a learning result, on the basis of a demographic attribute of the user, in subsequent processing.

(13)
The information processing device according to (2), in which, in a case in which a first response is presented by a voice, when a second response preceding to the first response becomes presentable, the processing unit causes the second response to be presented by a method other than a voice, prior to the first response.

(14)
The information processing device according to (3) or (4), in which the semantic analysis control unit inputs the interim result of the speech recognition to the semantic analysis processing on the basis of a result of recognition of the voice data, when a time of a pause of the speech of the user exceeds a fixed time, when a reliability score associated with the interim result of the speech recognition exceeds a fixed threshold value, when a specific wording is detected at a sentence end of a text of the interim result of the speech recognition, or when intonation indicating a question is detected in speech prosody.

(15)
The information processing device according to (3) or (4), in which the semantic analysis control unit inputs the interim result of the speech recognition to the semantic analysis processing on the basis of a result of recognition of the image data, when a face of the user is turned toward a predetermined target or is turned away from the predetermined target.

(16)
The information processing device according to (3) or (4), in which the semantic analysis control unit inputs the interim result of the speech recognition to the semantic analysis processing on the basis of a result of recognition of the sensor data, when the user looks toward a predetermined target or looks away from the predetermined target.

(17) The information processing device according to (3) or (4), in which the semantic analysis control unit inputs the interim result of the speech recognition to the semantic analysis processing on the basis of a result of the natural language recognition, when a segment of a predicate indicating a request or a question is detected.

(18) The information processing device according to any of (2) to (17), further including:
a response generation unit configured to generate a system response on the basis of a result of presence/absence determination of the response that is performed by the response presence/absence determination unit.

(19) The information processing device according to any of (2) to (18), further including:
a speech recognition unit configured to perform speech recognition processing for obtaining an interim result of the speech recognition from the speech of the user; and
a semantic analysis unit configured to perform the semantic analysis processing.

(20) An information processing method of an information processing device, the information processing method including:
the information processing device determining, on the basis of a result of semantic analysis that is to be obtained from an interim result of speech recognition of a speech of a user, presence or absence of a response to the speech of the user.

REFERENCE SIGNS LIST 1 speech dialogue system
10 terminal device
20 server
90 internet
101 voice input unit
102 image input unit
103 sensor unit
104 speech recognition unit
105 image recognition unit
106 sensor recognition unit
107 natural language processing unit
108 semantic analysis/response determination processing unit
109 response generation unit
110 speech synthesis processing unit
111 output image processing unit
112 voice output unit
113 image output unit
121 sequential semantic analysis control unit
122 semantic analysis unit
123 response presence/absence determination unit
1000 computer
1001 CPU

The invention claimed is:

1. An information processing device comprising:
a processing unit configured to determine, on a basis of a result of semantic analysis that is to be obtained from an interim result of speech recognition of a speech of a user, presence or absence of a response to the speech of the user,
wherein the processing unit includes
a semantic analysis control unit configured to sequentially input, to semantic analysis processing, the interim result of the speech recognition on a basis of at least one result of additional recognition that is to be obtained during the speech of the user, and
a response presence/absence determination unit configured to determine presence or absence of the response to the speech of the user on a basis of a result of the semantic analysis that is to be obtained by sequentially performing the semantic analysis processing,
wherein the processing unit determines presence or absence of the response to the speech of the user on a basis of a learning result corresponding to a use situation of the user,
wherein the processing unit
statistically learns, along a time axis, an input determination factor to the semantic analysis processing that is used when the speech of the user is completed, or an intention to be obtained by sequentially performing the semantic analysis processing, and
performs processing adapted to the learning result, on a basis of a demographic attribute of the user, in subsequent processing, and
wherein the processing unit is implemented via at least one processor.

2. The information processing device according to claim 1, wherein the at least one result of additional recognition includes one or more of a result of recognition of voice data of the speech of the user, a result of recognition of image data obtained by capturing an image of the user, a result of recognition of sensor data obtained by sensing the user or a surrounding of the user, or a result of natural language recognition that is obtained by performing natural language processing of the interim result of the speech recognition.

3. The information processing device according to claim 2, wherein the semantic analysis control unit determines a timing at which the interim result of the speech recognition is to be input to the semantic analysis processing, on a basis of a situation of the speech of the user that is to be obtained from the at least one result of additional recognition.

4. The information processing device according to claim 3, wherein the semantic analysis control unit inputs the interim result of the speech recognition to the semantic analysis processing on a basis of the result of the recognition of the voice data, when a time of a pause of the speech of the user exceeds a fixed time, when a reliability score associated with the interim result of the speech recognition exceeds a fixed threshold value, when a specific wording is detected at a sentence end of a text of the interim result of the speech recognition, or when intonation indicating a question is detected in speech prosody.

5. The information processing device according to claim 3, wherein the semantic analysis control unit inputs the interim result of the speech recognition to the semantic analysis processing on a basis of the result of the recognition of the image data, when a face of the user is turned toward a predetermined target or is turned away from the predetermined target.

6. The information processing device according to claim 3, wherein the semantic analysis control unit inputs the interim result of the speech recognition to the semantic analysis processing on a basis of the result of the recognition of the sensor data, when the user looks toward a predetermined target or looks away from the predetermined target.

7. The information processing device according to claim 3, wherein the semantic analysis control unit inputs the interim result of the speech recognition to the semantic analysis processing on a basis of the result of the natural language recognition, when a segment of a predicate indicating a request or a question is detected.

8. The information processing device according to claim 1, wherein the response presence/absence determination unit determines to make the response to the speech of the user at a time point at which a result of semantic analysis by which a system can execute a function that follows a dialogue with the user is obtained as a result of semantic analysis that is to be obtained by sequentially performing the semantic analysis processing.

9. The information processing device according to claim 8, wherein the response presence/absence determination unit determines to make the response to the speech of the user when an intention that can be executed as a function of the system is obtained on a basis of a result of semantic analysis that is to be obtained by sequentially performing the semantic analysis processing.

10. The information processing device according to claim 9, wherein the response presence/absence determination unit
records context information of the user on a basis of a result of first semantic analysis that is obtained at a certain time point, and
in a case in which a result of second semantic analysis that is subsequently obtained conforms to content of the recorded context information, determines to make a response that is based on the result of the second semantic analysis.

11. The information processing device according to claim 10, wherein, in a case in which a first response is being made prior to a second response serving as a target of determination, when the first response is based on the context information, the response presence/absence determination unit determines to make the second response after the first response is completed.

12. The information processing device according to claim 10, wherein, in a case in which a first response is being made prior to a second response serving as a target of determination, when the first response is not based on the context information, the response presence/absence determination unit determines to stop the first response and instantly make the second response.

13. The information processing device according to claim 1, wherein the response presence/absence determination unit determines presence or absence of the response to the speech of the user on a basis of intention and entity information that are to be obtained by sequentially performing the semantic analysis processing.

14. The information processing device according to claim 1, wherein, in a case in which a first response is presented by a voice, when a second response preceding to the first response becomes presentable, the processing unit causes the second response to be presented by a method other than a voice, prior to the first response.

15. The information processing device according to claim 1, further comprising:
a response generation unit configured to generate a system response on a basis of a result of presence/absence determination of the response to the speech of the user that is performed by the response presence/absence determination unit,
wherein the response generation unit is implemented via at least one processor.

16. The information processing device according to claim 15, further comprising:
a speech recognition unit configured to perform speech recognition processing for obtaining the interim result of the speech recognition from the speech of the user; and
a semantic analysis unit configured to perform the semantic analysis processing,
wherein the speech recognition unit and the semantic analysis unit are each implemented via at least one processor.

17. An information processing method of an information processing device, the information processing method comprising:
the information processing device determining, on a basis of a result of semantic analysis that is to be obtained from an interim result of speech recognition of a speech of a user, presence or absence of a response to the speech of the user;
sequentially inputting, to semantic analysis processing, the interim result of the speech recognition on a basis of at least one result of additional recognition that is to be obtained during the speech of the user;
determining presence or absence of the response to the speech of the user on a basis of a result of the semantic analysis that is to be obtained by sequentially performing the semantic analysis processing and on a basis of a learning result corresponding to a use situation of the user;
statistically learning, along a time axis, an input determination factor to the semantic analysis processing that is used when the speech of the user is completed, or an intention to be obtained by sequentially performing the semantic analysis processing; and
performing processing adapted to the learning result, on a basis of a demographic attribute of the user, in subsequent processing.

* * * * *